US010564260B2

(12) United States Patent
McPhee et al.

(10) Patent No.: US 10,564,260 B2
(45) Date of Patent: Feb. 18, 2020

(54) RANGE FINDING APPARATUS AND SYSTEM

(71) Applicant: Commonwealth Scientific and Industrial Research Organisation, Australian Capital Territory (AU)

(72) Inventors: Ronald John McPhee, Campbell (AU); Peter Bryan Reid, Campbell (AU)

(73) Assignee: Commonwealth Scientific and Industrial Research Organisation, Australian Capital Territory (AU)

( * ) Notice: Subject to any disclaimer, the term of this patent is extended or adjusted under 35 U.S.C. 154(b) by 311 days.

(21) Appl. No.: 15/516,794

(22) PCT Filed: Sep. 30, 2015

(86) PCT No.: PCT/AU2015/050587
§ 371 (c)(1),
(2) Date: Apr. 4, 2017

(87) PCT Pub. No.: WO2016/058039
PCT Pub. Date: Apr. 21, 2016

(65) Prior Publication Data
US 2017/0248691 A1    Aug. 31, 2017

(30) Foreign Application Priority Data

Oct. 17, 2014   (AU) ................. 2014904166

(51) Int. Cl.
*G01S 7/48*    (2006.01)
*G01S 7/481*   (2006.01)
(Continued)

(52) U.S. Cl.
CPC .......... *G01S 7/4813* (2013.01); *G01S 7/4817* (2013.01); *G01S 7/497* (2013.01); *G01S 17/10* (2013.01); *G01S 2007/4975* (2013.01)

(58) Field of Classification Search
CPC . G01J 5/0022; G01J 2005/0077; G01B 11/26; G01B 11/27; F41G 1/30
See application file for complete search history.

(56) References Cited

U.S. PATENT DOCUMENTS 4,003,655 A *  1/1977  Wasilko ............... G01B 11/02
                                                    244/3.16
4,557,598 A    12/1985 Ono et al.
(Continued)

FOREIGN PATENT DOCUMENTS

| EP | 1308747 A2 | 3/2007 |
| EP | 2388619 A1 | 3/2015 |
| RU | 2 510 498 C1 | 3/2014 |

OTHER PUBLICATIONS

Hokuyo Automatic Co., Ltd: Scanning range finder (SOKUIKI sensor): UTM-LN30, Nov. 13, 2013, pp. 1-2. [Retrieved from the Internet] <URL:http://www.hokuyo-aut.jp/02sensor/07scanner/ (recorded on Nov. 13, 2014, using the Wayback Machine).
(Continued)

*Primary Examiner* — Luke D Ratcliffe
(74) *Attorney, Agent, or Firm* — Kilpatrick Townsend & Stockton LLP

(57) ABSTRACT

A range finding system includes: an electromagnetic output to provide a first beam of electromagnetic radiation along a first beam path; an electromagnetic input to receive reflected electromagnetic radiation of the first beam from an object for determining a range of the range finding system from the object; and an enclosure including a side wall that surrounds a central axis of the enclosure, the side wall transparent to the electromagnetic radiation provided by the electromagnetic output. The electromagnetic output and electromagnetic input are disposed within the enclosure such that the electromagnetic input is located outside a second beam path of a second beam of electromagnetic radiation defined by a
(Continued)

specular reflection of the first beam on the side wall. Since the electromagnetic input is located outside the second beam path, the specular reflection of the first beam off the side wall does not reach the electromagnetic input.

18 Claims, 14 Drawing Sheets

(51) Int. Cl.
*G01S 7/497* (2006.01)
*G01S 17/10* (2020.01)

(56) References Cited

U.S. PATENT DOCUMENTS

| | | |
|---|---|---|
| 8,400,619 B1 | 3/2013 | Bachrach et al. |
| 2004/0031335 A1 | 2/2004 | Fromme et al. |
| 2008/0002176 A1* | 1/2008 | Krasutsky ............ G01S 7/4811 |
| | | 356/4.01 |
| 2009/0002678 A1 | 1/2009 | Tanaka et al. |
| 2012/0001743 A1* | 1/2012 | Cotten ..................... B60Q 9/00 |
| | | 340/438 |
| 2014/0029001 A1* | 1/2014 | Young ................... G01J 5/0022 |
| | | 356/252 |

OTHER PUBLICATIONS

International Search Report and Written Opinion corresponding to PCT/AU2015/050587 dated Dec. 16, 2015, 10 pages.
Search Report for RU Application No. 2017113627 completed Apr. 25, 2019, all pages.
EP Patent Application No. 15850109 Search Report dated May 16, 2018, all pages.
International Search Report and Written Report and Written Opinion for PCT/AU2015/050587 dated Dec. 16, 2015, all pages.

* cited by examiner

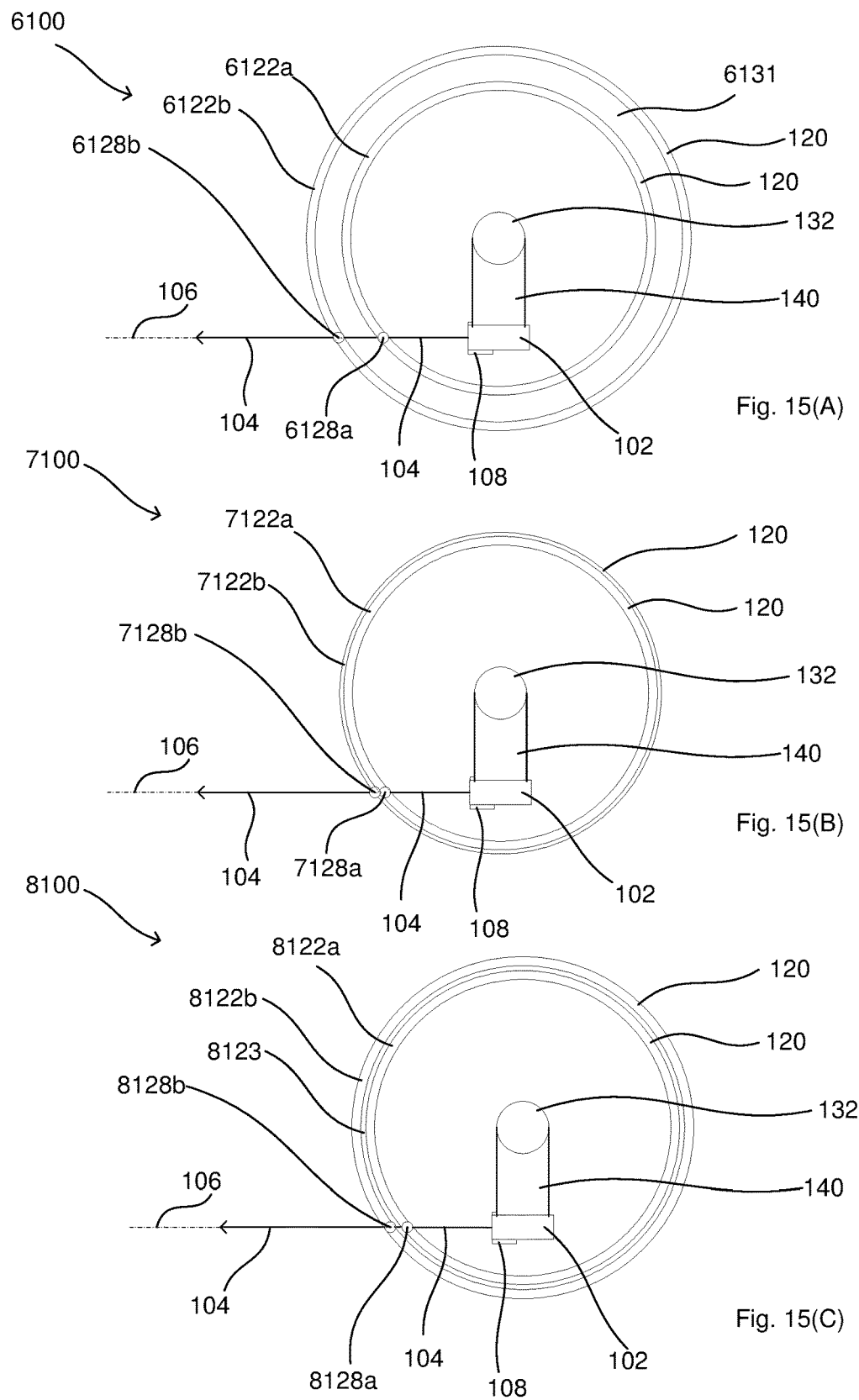

RANGE FINDING APPARATUS AND SYSTEM

CROSS-REFERENCE TO RELATED APPLICATIONS

The present application claims priority from Australian Provisional Patent Application No 2014904166 filed on 17 Oct. 2014, the content of which is incorporated herein by reference.

TECHNICAL FIELD

The present disclosure relates to a range finding apparatus for determining a range of the apparatus from an object. The present disclosure also relates to a range finding system for determining the range to the object.

BACKGROUND

Determining range information from an observation location to one or more objects in an environment is important for many applications. For example, range information can be used by a surveyor as one measurement to determine the location of object(s) in an environment. Range information, in conjunction with other information such as orientation of the object relative to the observation location(s), and the location information of the observation location(s) can be used to construct maps with topographic information, or other forms of representation showing the location of object(s), and/or contours of the object(s) in the environment.

In a known form, a range finding apparatus is provided at an observation location, and the apparatus includes a laser emitter to transmit a laser light beam towards an object. The light beam is reflected off the object and the reflection of light is detected by a sensor of the range finding apparatus. The time of flight of the light travelling from the laser emitter to the object, and from the object to the sensor is measured. This time of flight, in conjunction with the speed of light, is used to determine the range between the range finding apparatus at the observation location and the object.

Further forms of range finding apparatus include three dimensional scanners that determine multiple ranges at multiple orientations from the observation location. In one form, this includes a laser range finder that is steered to provide the multiple measurements at respective orientations. The measurements may be used to provide contour information of object(s) or even the environment surrounding the observation location. Such information may be useful for determining the size and shape of surrounding features in an underground mine.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

The present disclosure provides a range finding system including: an electromagnetic output to provide a first beam of electromagnetic radiation along a first beam path; an electromagnetic input to receive reflected electromagnetic radiation of the first beam from an object for determining a range of the range finding system from the object; and an enclosure including a side wall that surrounds a central axis of the enclosure, the side wall transparent to the electromagnetic radiation provided by the electromagnetic output, wherein the electromagnetic output and electromagnetic input are disposed within the enclosure such that the electromagnetic input is located outside a second beam path of a second beam of electromagnetic radiation defined by a specular reflection of the first beam on the side wall.

Since the electromagnetic input is located outside the second beam path, the specular reflection of the first beam off the side wall does not reach the electromagnetic input. This may prevent or reduce the effect of the specular reflection of the first beam dazzling or otherwise interfering with the electromagnetic input.

In one example, the present disclosure provides a range finding system to avoid specular reflection of the first beam from the side wall from interfering with the electromagnetic input by locating and orientating the electromagnetic output so that the electromagnetic radiation does not reflect off the side wall and back towards the electromagnetic output and the proximally located electromagnetic input. In a further example, this is achieved by locating and orientating the electromagnetic output so that the angle of incidence of the first beam to the side wall is not at (nor close to) zero degrees.

In one form of the range finding system the enclosure further includes one or more features which prevent the ignition of gas outside the enclosure by ignition triggers from the inside of the enclosure. These features, referred herein as flame proof features may be found in recognised standards on flame and explosion proof enclosures, such as IEC 60079-0 Ed. 6.0 b:2011 and IEC 60079-1 Ed. 7.0 b:2014. Other standards on flame and explosion proof enclosures may be found in US standards: ANSI/UL1203:2006, British standards BS EN 60079-1:2007; and/or Australian standards AS60079.1:2007. In some embodiments, these features include sealing elements that in conjunction with the side wall seal an inside of the enclosure from outside of the enclosure such that the one or more sealing elements prevent ignition of gas outside the enclosure by ignition triggers from the inside of the enclosure. In one example, the seal is a hermetic seal. In an alternative embodiment the flame and explosion proof enclosure is not perfectly sealed from the surrounding atmosphere, but may instead include parts that, when assembled, are a close fit with some gaps. However the configuration of the gaps may be designed to quench the flame from an ignition inside the enclosure before it can propagate to the atmosphere outside of the enclosure. Such configurations may include, for example, having gaps that are relatively small size and/or gaps that have a tortuous path (e.g. a labyrinth) to prevent or decrease the chance of propagation of a flame In an alternative embodiment the enclosure comprises an inner wall and an outer wall. The outer wall preferably functions to provide an impact resistant barrier, preferably to conform to the abovementioned standards. The inner wall preferably functions to withstand high pressures, preferably to conform to the abovementioned standards. (e.g. at least 100 kPa, preferably at least 500 kPa and more preferably at least 1000 kPa). The inner and outer wall may be constructed of the same or different materials. In a preferred embodiment, the inner and outer walls are constructed of glass. In an alternative embodiment, one wall is produced from glass and the other from plastic, for example the outer wall may be constructed of glass and the inner wall may be constructed of a transparent plastic, such as polycarbonate.

In yet another embodiment, the outer wall comprises a peelable transparent plastic film, such as polyester films successfully used on racing car windshields are made by MADICO, Inc., Woburn, Mass. as its product designations LCL-600-XSR and LCL-800-XSR and a 5-7 mil film sold by that company. The peelable film has the advantage of being replaceable if the film became scratched, thereby maintaining the desired transparency of the enclosure.

Preferably, the inner and outer wall is laminated or adhered together using an adhesive layer. The adhesive layer could comprise of a liquid resin is a made from a plastic polymer formulated from an acrylic or silicone base compound, which may include photo initiators which will tend to cure the applied resin very quickly when it is exposed to UV light. One such adhesive could be UV CURE 7155 from Epoxies Etc., Deco-Coat Product Line, 21 Starline Way, Cranston, R.I. 02921. In a preferred embodiment, the adhesive agent comprises polyvinyl butyral (PVB). The adhesive layer preferably reduces the propensity and/or magnitude of the enclosure to provide multiple reflections of the electromagnetic radiation source as well as providing an impact barrier between the inner and outer wall.

In an exemplary embodiment, the enclosure comprises a dual walled glass cylinder consisting of an inner and an outer glass cylinder laminated together using PVB (polyvinyl butyral) or other suitable laminating/adhesive substance.

The range finding system may further include: a first support element rotatable within the enclosure around a first rotation axis, wherein the electromagnetic output is supported by the first support element such that rotation of the first support element steers the first beam provided by the electromagnetic output.

In a further form, the electromagnetic output is offset from the first rotation axis so that the first beam path from the electromagnetic output to the side wall does not intersect with the first rotation axis. In another form, the first rotation axis is coaxial with the central axis.

The range finding system may further include: a second support element to provide support between the electromagnetic output and the first support element, wherein the second support element is rotatable around a second rotation axis, and wherein rotation of the second support element steers the first beam provided by the electromagnetic output. In a further form, the second rotation axis is perpendicular to the first rotation axis.

In one form, the range finding system further includes: a controller module to steer the first beam to a plurality of orientations to provide a plurality of range determinations of the object(s) in a surrounding environment. In yet another form, the range finding system includes a processor to generate a representation of the surrounding environment in three dimensions based on the plurality of range determinations.

In one form of the range finding system, the electromagnetic output includes a laser emitter to provide the first beam in the form of laser light and wherein the electromagnetic input includes a light sensor to receive reflected laser light from the object.

In an alternative form, the range finding system includes a laser emitter to provide the first beam in the form of laser light, wherein the electromagnetic output includes a first reflector to redirect the first beam onto the first beam path. In a further form, the range finding system includes a light sensor to detect reflected laser light from the object, wherein the electromagnetic input includes a second reflector to redirect reflected laser light towards the light sensor.

In one form of the range finding system, an angle of incidence between the first beam path and a surface normal of the side wall is greater than 5 degrees. The angle of incidence is preferably no more than 40 degrees and more preferably no more than 30 degrees. Angles less than 5 degrees increase the risk of specular reflection interfering with the electromagnetic input. Higher angles may suffer from an increase in reflection from the sidewall and a resultant decrease in range finder performance.

In one form of the range finding system, an angle of incidence between the first beam path and a surface normal of the side wall is less than a critical angle with of the side wall.

In one form of the range finding system, the side wall is a cylindrical side wall. The geometry of the side wall will be dictated by the functional requirement that the electromagnetic output and electromagnetic input are disposed within the enclosure such that the electromagnetic input is located outside a second beam path of a second beam of electromagnetic radiation defined by a specular reflection of the first beam on the side wall.

In one form of the range finding system, system further comprises a controller to steer the first beam towards a reflector; determine an intensity value indicative of an intensity of light reflected off the reflector and received by the light sensor; and determine a level of contamination by coal dust particles based on the intensity value.

The present disclosure also provides a range finding apparatus for use within a flame proof enclosure including a side wall that surrounds a central axis of the enclosure, the range finding apparatus including: an electromagnetic output to provide a first beam of electromagnetic radiation along a first beam path through the cylindrical side wall; an electromagnetic input to receive reflection of the first beam from an object for determining a range of the range finding apparatus from the object; a first support element rotatable around a first rotation axis, wherein the electromagnetic output is supported by the first support element and rotation of the first support element steers the first beam, and wherein the electromagnetic output is mounted offset from the first rotation axis so that an axis of the first beam path from the electromagnetic output to the cylindrical side wall does not intersect with the first rotation axis, such that when the range finding apparatus is within the enclosure with the first rotation axis coaxial to a centre axis of the cylindrical side wall, the electromagnetic input is located outside a second beam path of a second beam caused by specular reflection of the first beam on the cylindrical side wall.

In one form, the range finding apparatus further includes a second support element to provide support between the electromagnetic output and the first support element, wherein the second support element is rotatable around a second rotation axis wherein rotation of the second support element steers the first beam provided by the electromagnetic output, wherein the second rotation axis is perpendicular to the first rotation axis.

The present disclosure also provides a method of determining a range of an object within an enclosed environment using the range finding system or the range finding apparatus described above. In one example, the method is performed in an enclosed environment such as a coal mine.

The present disclosure also provides a method of mapping the surface of one or more objects, wherein the method includes performing a plurality of range determinations to the one or more objects using the range finding system or range finding apparatus described above.

The is also provided disclosure of the use of the range finding system or the range finding apparatus described above for performing a plurality of range determinations to the one or more objects.

BRIEF DESCRIPTION OF DRAWINGS

Examples of the present disclosure will be described with reference to:

FIGS. 15(a) to 15(c) are top view of alternative forms of the enclosure of the range finding system.

DESCRIPTION OF EMBODIMENTS

An embodiment of the range finding system 100 will now be generally described with reference to FIGS. 1 and 2.

Figure 1:
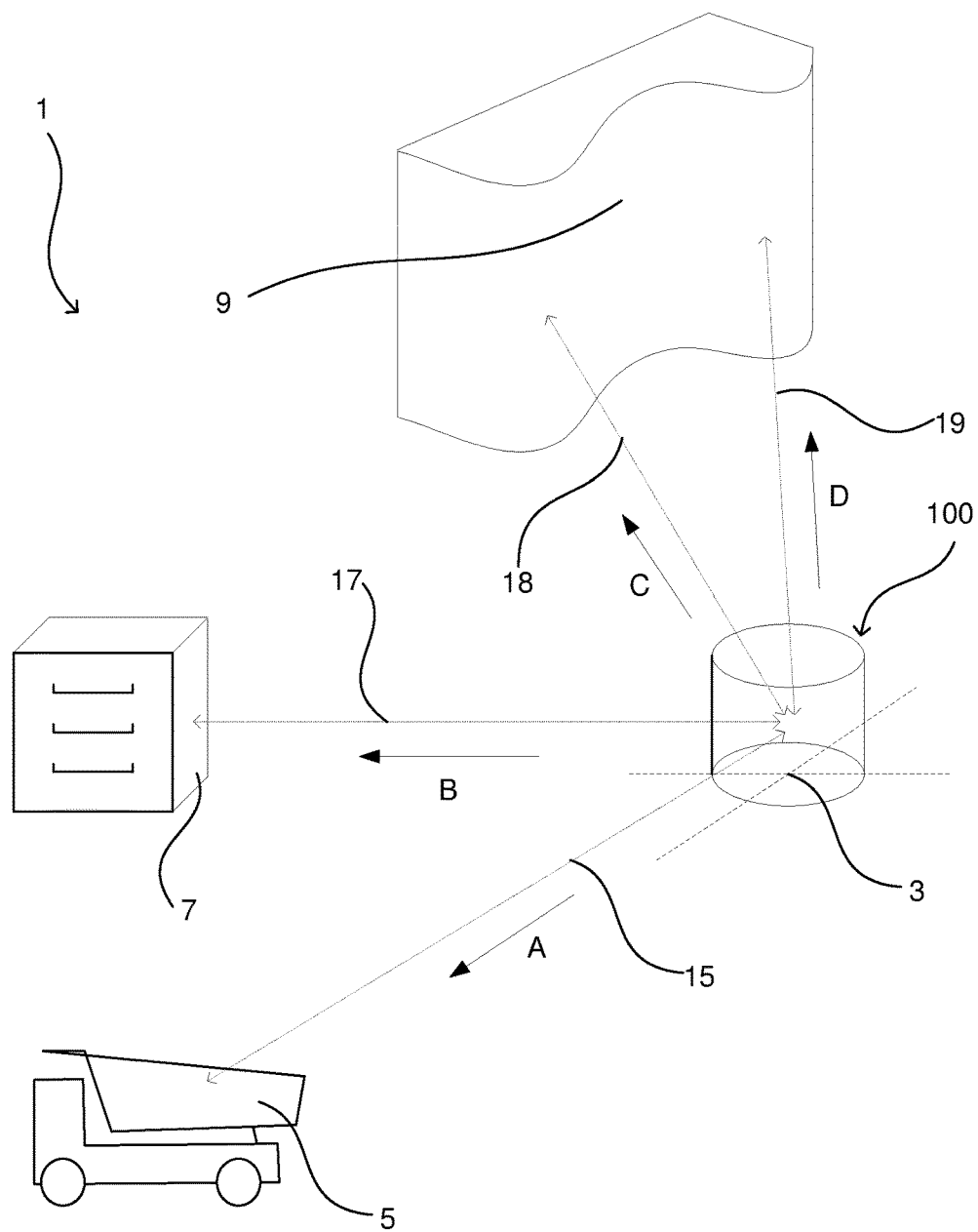
FIG. 1 illustrates a simplified view of a range finding system positioned to measure the distance of object in a surrounding environment.

FIG. 1 is a simplified view of a range finding system 100 provided at an observation location 3 to determine range information with respect to an environment 1. The environment 1 includes objects 5, 7, and 9 that are within line of sight of the range finding system 100. The range finding system 100 can be steered to direction A to determine a first range 15 between the observation location 3 and the first object 5, whereby first object 5 is in direction A relative to the observation location 3. Similarly, the range finding system 100 can be steered to determine a second range 17 in direction B to the second object 7. Multiple range determinations may also be made on one object, as illustrated by third and fourth ranges 18 and 19 in directions C and D on the third object 9. Multiple range determinations can be made in multiple directions and the range information combined to provide contour information of the environment, such as in a three-dimensional point cloud. In one example application, the object 9 is a coal face in an underground coal mine. Providing contour information, that is mapping the surface of the coal face, using the range finder disclosed herein has the advantage that less personnel enters unsupported parts of the mine and machinery can be controlled more efficiently.

The range finding system 100 will now be briefly described with reference to FIG. 2. The range finding system 100 includes an electromagnetic output 102 to provide a first beam 104 of electromagnetic radiation along a first beam path 106 towards an object 112. The first beam 104 is reflected from the object to provide reflected electromagnetic radiation 110. The range finding system 100 also includes an electromagnetic input 108 to receive reflected electromagnetic radiation 110 of the first beam from the object 112 for determining a range 114 of the range finding system 100 from the object 112. The system 100 also includes an enclosure 120 having a side wall 122 surrounding a central axis 136 that is transparent to the electromagnetic radiation provided by the electromagnetic output 102. The electromagnetic output 102 and the electromagnetic input 108 are disposed within the enclosure 120 such that the electromagnetic input 108 is located outside a second beam path 124 of a second beam 126 of electromagnetic radiation that is defined by specular reflection 128 of the first beam 104 on the side wall 122. This configuration advantageously avoids or reduces negative effects of specular reflection 128 of the first beam 104 that may dazzle the electromagnetic input 108, provide erroneous readings, reduce the effectiveness or lifespan of the electromagnetic input 108, and/or otherwise affect range determination of the range finding system 100.

The range finding system 100 includes one or more sealing elements 130 that, in conjunction with the side wall 122, seal the inside of the enclosure 120 from outside of the enclosure 120. This configuration may advantageously prevent ignition of gas outside the enclosure 120 by ignition triggers from the inside of the enclosure.

The range finding system 100 further includes a first support element 132 rotatable within the enclosure 120 around a first rotation axis 134. The electromagnetic output 102 is supported by the first support element 132 such that rotation of the first support element 132 steers the first beam 104 provided by the electromagnetic output 102. This allows the range finding system 100 to steer the first beam 104 for determining ranges in a plurality of directions. A second support element 140 is provided between the electromagnetic output 102 and the first support element 132, and the second support element 140 is rotatable around a second rotation axis 142 to provide a further degree of freedom for steering the first beam 104. In the illustrated embodiment, the configuration avoids the specular reflection 128 of the first beam from dazzling the input 108 throughout a 360 degree rotation of the first support element 132 around the first rotation axis 134.

The components of the range finding system 100 will now be discussed in detail.

First and Second Support Elements

Figure 3:
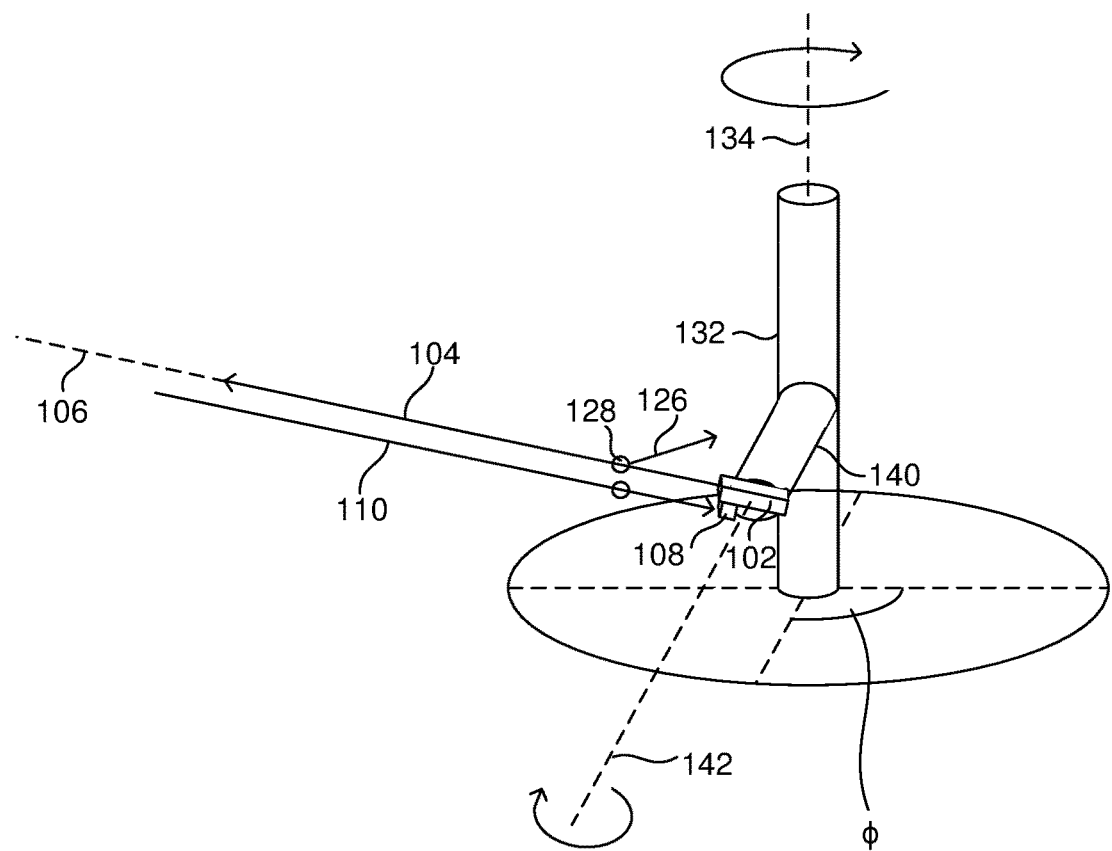
FIG. 3 is a perspective view of the electromagnetic output, electromagnetic input, and first and second support elements of the range finding system.

The first and second support elements 132, 140 will now be described with reference to FIGS. 3 to 5. The first support element 132 rotatably supports the second support element 140. The second support element 140, in turn, rotatably supports the electromagnetic output 102 and the electromagnetic input 108.

The first support element 132 is rotatable around the first rotation axis 134, to provide azimuth direction φ for steering electromagnetic output 102 and electromagnetic input 108. In one embodiment, the first support element 132 is rotatable around a full 360 degrees to allow the range finding system 100 to take a plurality of range measurements for scanning the surrounding environment.

Figure 8:
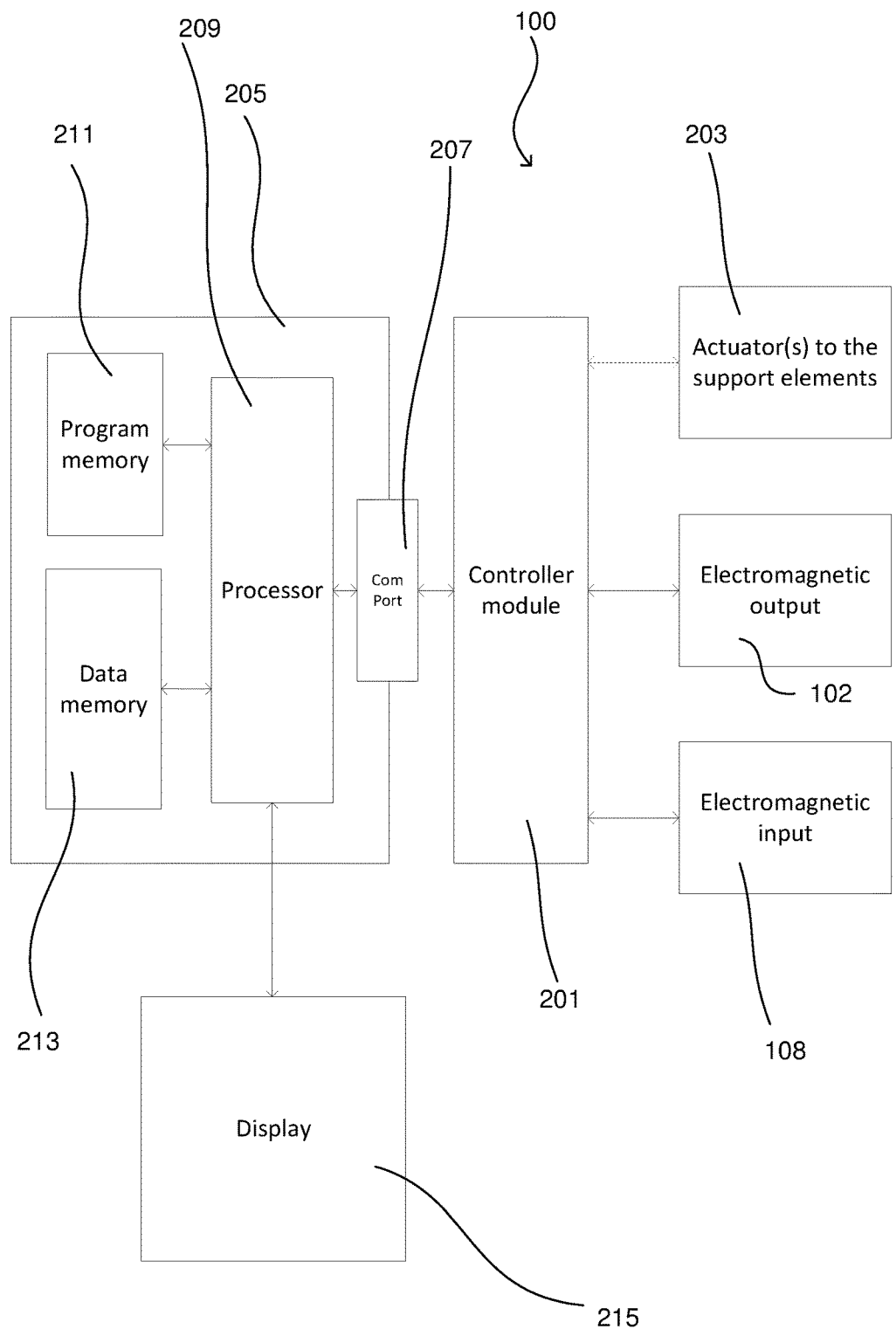
FIG. 8 is a schematic of the range finding system with a controller module, a computer system and a display.

The first support element 132 is operatively coupled to an actuator 203 (as shown in FIG. 8) to rotate the first support element 132, along with the supported second support element 140, electromagnetic output 102 and electromagnetic input 108. In one form, the actuator is a motor, such a stepper motor that receives actuation inputs from a controller module 201. The actuator may operate to actuate the first support element 132 directly, such as a direct drive, or indirectly, such as through a gear mechanism or a belt drive. In one form, the gear mechanism or belt drive provides a reduction in rotational speed of the drive to allow greater accuracy in movement of the first support element 132.

The second support element 140 is rotatable around the second rotation axis 142, different to the first rotation axis 134, to provide a further degree of freedom to the supported electromagnetic output 102 and input 108. The second support element 140 supports the electromagnetic output 102 offset from the first rotation axis 134 so that the first beam path from the output 102 to the side wall 122 does not intersect the first rotation axis 134. This configuration, along with the coaxial first rotation axis and centre axis 136 provides a beam path 106 that has an angle of incidence with the cylindrical side wall 122 that is neither at nor close to zero degrees. In other words, the beam path 106 is not along the surface normal 111 of the cylindrical side wall 122, as illustrated in FIG. 5. As a result, the specular reflection 128 of the first beam 104 on the cylindrical side wall 122 provides a second beam 126 having a second beam path 124 that is directed away from the electromagnetic output 102, and more importantly, away from the electromagnetic input 108 that is located proximal to the electromagnetic output 102.

Furthermore, the beam path 106 may preferably have an angle of incidence with the cylindrical side wall 122 that is neither at nor close to 90 degrees. A large angle may cause a significant specular reflection of the electromagnetic radiation, thereby reducing the electromagnetic radiation 110 that would be received by the electromagnetic input 108.

In one form, the electromagnetic output 102 is supported by the second support element 140 such that the first beam 104 provided by the electromagnetic output 102 is substantially perpendicular to the second rotation axis 142.

In one embodiment, the second rotation axis 142 is perpendicular to the first rotation axis 134. The second support element 140 provides adjustment in elevation θ of the electromagnetic output 102 and input 108 relative to a horizontal plane 138 that is perpendicular to the first rotation axis 134. The movement of the second support element 140 may be by an actuator 203 such as those discussed above.

The first 132 and second 140 support elements, by being rotatable around different axes 134, 142 allow steering of the first beam 104 of electromagnetic radiation. It is to be appreciated that in other embodiments, the second rotation axis 142 does not need to be perpendicular to the first rotation axis 134 to provide the additional degree of freedom. However, the perpendicular arrangement of these rotation axes may assist ease of control and calculation of the direction of the first beam 104.

Electromagnetic Output and Electromagnetic Input

The electromagnetic output 102 and electromagnetic input 108 are operable to provide time-of-flight information to allow determination of range. In one form, the electromagnetic output 102 and input 108 are substantially co-located (or adjacent to each other) with the output 102 and input 108 directed by the first and second support elements 132, 140 in the same direction. Usually, this involves directing the electromagnetic output 102 and input 108 towards the object 112, although some variations may be included to take into account refraction, displacement, or other alignment considerations which will be discussed in detail below.

In one form, the electromagnetic output 102 and input 108 are in the form of a laser range finder. Thus the electromagnetic output 102 may be in the form of a laser emitter that emits one or more pulses of laser light for the first beam 104. The electromagnetic input 108 may be in the form of a light sensor that is sensitive to the laser light. An example of a laser emitter may include a laser diode. The wavelength of laser light may include, 850 nm, 905 nm, 1535 nm. In one form the power output of the laser light is controlled to ensure the laser output meets safety requirements such as being an eye safe laser and/or to prevent the laser light becoming an ignition trigger. In one form, the combined power of the laser and other components in the enclosure 120 (such as motors, actuators, light sensor, controller, radio communication modules etc). is less than 6 W. In one embodiment the effective radiated power (9 kHz to 60 GHz) from the apparatus is preferably not more than 10 W, more preferably no more than 6 W and even more preferably no more than 4 W. The laser preferably has an effective radiated power of no more than 1 W and more preferably no more than 150 mW. In a particular embodiment, the apparatus conforms to the effective radiated power (9 kHz to 60 GHz) of IEC 60079-0:2011, preferably for Group I gases (e.g. for coal mining environments).

To provide a range determination, a pulse of laser light (in the first beam 104) is provided by the electromagnetic output 102 that travels through the side wall 122 of the enclosure 120 and towards the object 112. The light is reflected off the object 122, and at least some of the reflected laser light 110 travels back towards the range finding system 100, passing through the side wall 122 to be received by the electromagnetic input 108. The time of flight between output 102 of the pulse of light to receiving the input of the reflection is used to determine range. For a system 100 where the output 102 is located near the input 108, range, or at least an approximation thereof, may be determined by the following equation:

$$\text{Range} = \frac{(\text{Time of flight}) \times (\text{Speed of light through the medium})}{2} \quad \text{(Equation 1)}$$

It is to be appreciated that this equation may be varied to take into account known variables and constants. For example, the laser light of the first beam 104 travelling through the enclosure 102 may travel at a speed less than the speed of light through air. A variation may include calculating the time delay for the pulse of light travelling through the side wall 122. In one form, the average thickness of the side wall 122 may be used. In another form, the distance that the beam 104 has to travel through the enclosure at the given orientation of the electromagnetic output 102 may be used. In another example, there may be delays in the response time of one or more of the components. This may be taken into account by modification of Equation 1 or through calibration of the system 100.

In one form the electromagnetic output 102 and electromagnetic input 108 are housed inside a casing (not shown). The casing, along with the electromagnetic output 102 and electromagnetic input 108 housed within, is supported by the second support element 140. Therefore when the first 132 and second 140 support elements are rotated, the casing (with the output 102 and input 108) is also rotated. The casing is sealed to reduce dust contamination. In a further embodiment, the casing is sealed to reduce the risk of ignition triggers inside the casing from igniting gas (or other combustible material) outside of the casing. This provides a further layer of safety in addition to that provided by the sealed enclosure 120. In another form, the casing may also include a filter covering the electromagnetic input 108 that allows transmission of the wavelength of the reflected electromagnetic radiation 110, but absorbs or reflects one or more other wavelengths.

Enclosure

Figure 2:
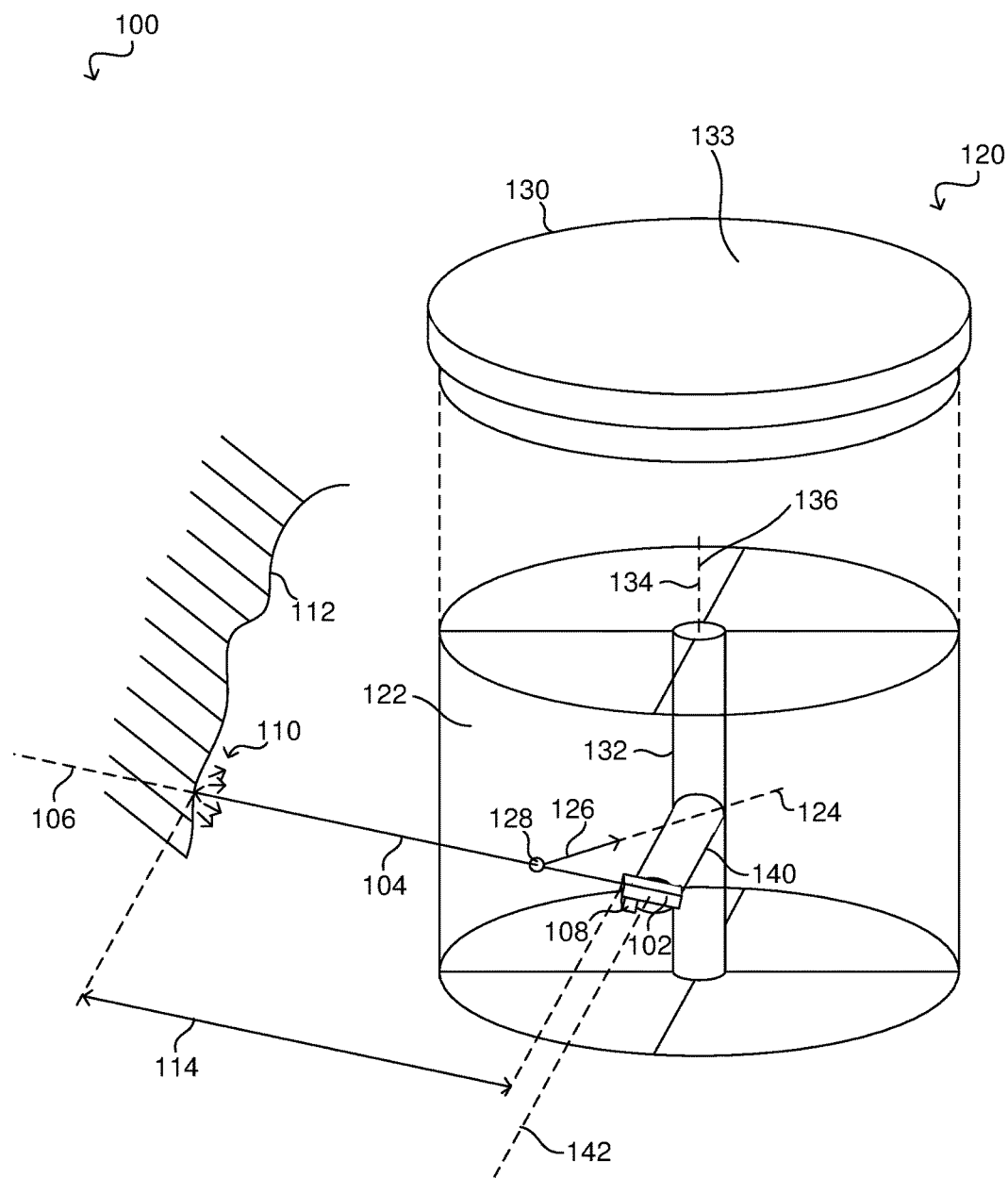
FIG. 2 is a perspective view of a range finding system providing a first beam of electromagnetic radiation to an object for determining a range to the object.

In the embodiment shown in FIG. 2, the enclosure includes the side wall 122 and a sealing element 130, in the form of a circular cover 133, that is received at the a top portion of the side wall 122. A further sealing element 130, in the form of a base (not shown), is provided to interface with the bottom portion of the cylindrical side wall 122.

In the illustrated embodiment, the side wall 122 is a curved side wall that extends around the central axis 136 to form a cylindrical side wall. In this embodiment, the wall extends for 360 degrees around the central axis 136. This facilitates the range finding system 100, in particular the electromagnetic output 102 and input 108 mounted on the first support element 132, to scan in a plurality of directions. In one embodiment, this allows the first support element 132 to rotate and scan a full 360 degrees around the range finding system 100.

In one embodiment the first rotation axis 134 is coaxial with the central axis 136 of the cylindrical side wall 122. This arrangement can allow simplified calculation and/or calibration of the range finding system 100. In particular, it can simplify calculation (and/or calibration) of changes in direction, or displacement, of the first beam 104 as the beam passes through the cylindrical side wall 122, because the angle between the first beam 104 and the surface normal 111 is independent of the azimuth direction $\phi$.

Figure 10:
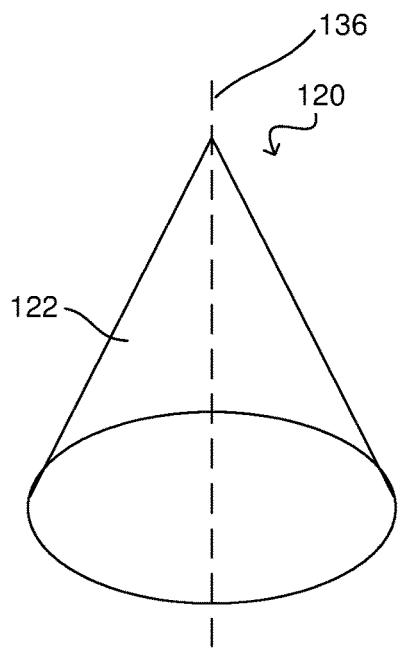
FIGS. 10(a) to 10(d) are perspective views of alternative forms of an enclosure of the range finding system.
Figure 10:
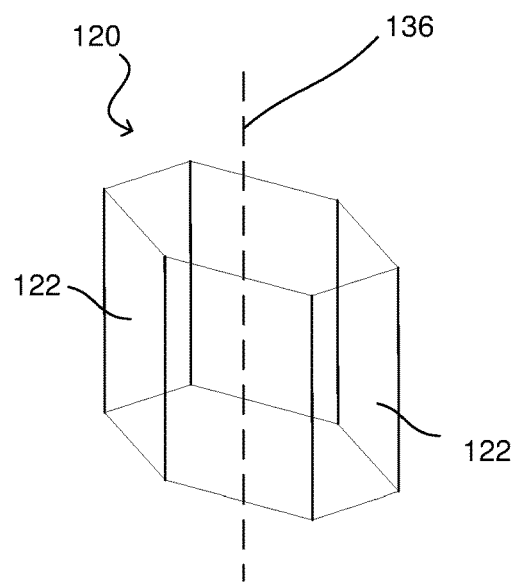
Figure 10:
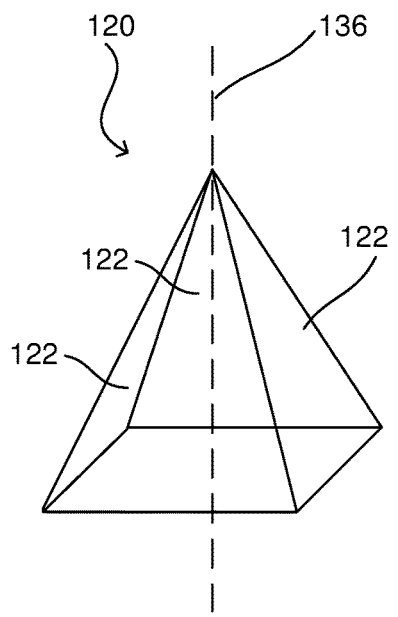
Figure 10:
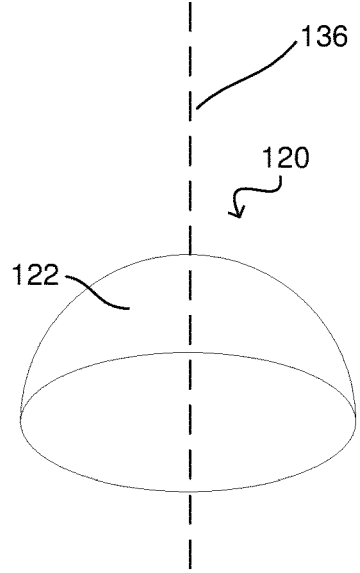

In an alternative forms, the side wall 122 may include more than one single curved surface or facet, and may be of other shapes. FIGS. 10(*a*) to (*d*) illustrate alternative forms of enclosures 120. FIG. 10(*a*) illustrates an enclosure with curved side wall 122 that is, at least in part, the curved side wall resembling the surface of a cone. FIG. 10(*b*) illustrates a multi-faceted side wall 122 resembling a hexagonal prism. FIG. 10(*c*) illustrates yet another alternative enclosure 120 having planar side walls 122 to form an enclosure that resembles a square pyramid. FIG. 10(*d*) illustrates another embodiment where the enclosure 120 includes a hemispherical side wall 122.

As noted above, the configuration of the sealing elements 130 and the cylindrical side walls 122 seal the inside of the enclosure 120 from the outside of the enclosure 120. In one form, the seal is a hermetic seal that prevents or substantially prevents gasses from transferring between the inside and outside of the enclosure 120. The hermetic seal prevents or reduces the risk of an ignition trigger, such as an electrical spark, inside the enclosure 120 from propagating and causing an ignition of gas outside of the enclosure 120. This is advantageous when the range finding system 100 is used in an environment with combustible fuels such as hydrocarbon gas (such as methane), coal dust, etc. that can be found in underground mines.

It is to be appreciated that in other embodiments, the seal formed by the sealing elements 130 with the cylindrical side walls 122 may not be a perfect hermetic seal. In one form a close fit between the sealing 130 and the cylindrical side walls 122 may provide a sufficient barrier to prevent propagation of a flame or other ignition triggers from inside of the enclosure 120 to outside of the enclosure 120. In one example, one or more gaps may exist between the cylindrical side walls 122 and the sealing elements 130. Alternatively, the cylindrical side walls 122 and/or the sealing elements 130 may include one or more gaps. In one form, the one or more gaps, and the enclosure 120 in general, are compliant with requirements for construction of flameproof enclosures such as IEC 60079-0 Ed. 6.0 b:2011 and IEC 60079-1 Ed. 7.0 b:2014, or one or more of the other standards discussed herein.

In the illustrated embodiment, the sealing elements 130 are removably attached with the cylindrical side wall 122. This allows access and servicing of parts, such as the electromagnetic output 102 and electromagnetic input 108, within the enclosure 120. In another embodiment, the sealing elements 130 may be permanently attached to the cylindrical side wall 122 to maintain integrity of the seal, and/or prevent or reduce the potential for tampering of the enclosure 120 and components therein. In yet another embodiment, one or more of the sealing elements 130, such as the circular cover 133 or base 134, may be integrally formed with the circular side wall 122.

In some embodiments the sealing elements 130 are, at least in part, formed of steel or engineering grade plastic. The sealing elements 130 may be formed of a material, or covered with a material, that is non-reflective or substantially non-reflective to the wavelength of the electromagnetic radiation from the electromagnetic output 102. This reduces opportunity and/or the intensity for the electromagnetic radiation from the electromagnetic output 102 from reflecting multiple times within the enclosure 120 that could be received by the electromagnetic input 108.

The side wall 122 of the enclosure 120 is made of a material selected to be substantially transparent to allow transmission of the wavelength of the electromagnetic radiation from the electromagnetic output 102. In one example, the material includes a glass that is transparent to the wavelength of light produced by a laser emitter. Transparent in this context means that there may be some attenuation of the radiation but the intensity of the transmitted radiation is sufficient to allow sensing of the radiation reflected from the object.

The material of the cylindrical side wall 122 may be transparent to wavelengths other than that of the electromagnetic output 102. In one embodiment, it may be desirable to exclude these other wavelengths from being received by the electromagnetic input 108. This may include providing a coating on the cylindrical side wall 122 that reflects the other wavelengths to prevent such electromagnetic radiation, outside of the enclosure 120, from entering into the enclosure 120 and being received by the electromagnetic input 108. Alternatively, the cylindrical side wall 122 may be provided with a coating to absorb such other wavelengths. In another embodiment, the enclosure may be constructed of a material that is inherently opaque to one or more of the other wavelengths. In yet another embodiment a filter may be provided, either outside of the enclosure, or inside of the enclosure, to filter out or reduce the intensity of such other wavelengths from being received by the electromagnetic input 108.

In one example of the range finding system 100, the cylindrical side wall 122 is formed of toughened glass with a thickness of approximately 10 mm. The internal diameter of the cylindrical side wall 122 has a radius of 150 mm. This example includes an electromagnetic output 102 that is offset by 30 mm from the first rotation axis 134 (and the central axis 136), and with the electromagnetic output 102 providing a first beam 104 in a direction substantially perpendicular to the second rotation axis 142. These dimensions provide a first beam 104 that is incident on the side wall 122 at an angle away from the surface normal 111. Preferably the surfaces of the side wall 122 should be as smooth and consistent to prevent or reduce distortions in the beams.

The side wall preferably possesses the following optical properties, in reference to the operating wavelength(s) of the range finding system:
  The internal surface of the side wall has a specular reflection (measured at an incident angle of 5 degrees) of preferably no more than 10%, more preferably no more than 5% and even more preferably no more than 2% and yet even more preferably no more than 1%; and
  The transparency of the side wall (measured at an incident angle of 5 degrees) is such that there is at least 90% transmission, more preferably 95% transmission and even more preferably 98% transmission of the operating wavelength(s).

A combination of low internal reflection and high transmission promote excellent range finder performance and reliability. Low internal reflection may be achieved through use of an anti-reflective coating, such as Claryl™ available from DSM (Netherlands).

Controller Module, Computer System and Display

FIG. 8 illustrates an embodiment of the range finding system 100 further including a controller module 201 to provide inputs to actuators 203 for operatively moving the first and second support elements 132, 140 to steer the first beam 104 of the electromagnetic output 102. This allows a plurality of range determinations of one or more objects 5, 7, 9, 112 in the surrounding environment. The controller module 201 is also interfaced with the electromagnetic output 102 to control the generation the first beam 104, such as providing a command to operatively generate a pulse of laser light. Furthermore, the controller module 201 is interfaced with the electromagnetic input 108 to receive information from the electromagnetic input 108, such as information from a light sensor. In one form the controller 201 includes a timing module (not shown) for determining the time of flight, based on the time difference from the pulse of the laser light travelling from the electromagnetic output 102 to the time the reflected light 110 is received by the electromagnetic input 108. In one form the timing module comprises an oscillating quartz and the controller counts the number of oscillations between generating the pulse of laser light and receiving a signal from the light sensor. The controller then multiplies the counted number by a constant to determine the range. For example, the oscillation frequency may be 256 MHz, which results in a resolution factor of 1.17 m.

In one form, the controller module is an ATmega640 microcontroller produced by Atmel.

The range finding system 100 further includes a computer system 205 that is in communication with the controller module 201 through a communication port 207. The computer system 205 includes a processor 209 connected to a program memory 211, data memory 213 and the communication port 207. The program memory 211 is a non-transitory computer readable medium, such as a hard drive, a solid state disk or CD-ROM.

Software, that is an executable program, stored on program memory 211 causes the processor 209 to perform the tasks, such as determining the distance of the an object 5, 7, 9, 112 to the range finding system 100, the relative orientation of that object 5, 7, 9 and 112 to the range finding system 100, the relative location of the object and/or the absolute location of one or more points on the surface of that object 5, 7, 9 and 112. Such information can be determined based on receiving time-of-flight information from the controller module 201 and information relating to the orientation of the electromagnetic input 102, the steered beam 104, and/or the control inputs to the actuators 203.

Additional tasks may include the processor 209 directing the controller module 201 to perform scans (by multiple range determinations) on selected areas at selected times. This may include specific instructions to operate the actuators 203 and the electromagnetic output 102.

The processor 209 may then store in a data store 213 the distance of the object 5, 7, 9, 112 to the range finding system 100, and other information, such as location of the range finding system, environmental conditions, the time and date, time-of-flight information of the pulse of the beam and information to determine the orientation of the electromagnetic output 102 and input 108. The information in the data store 213 can be retrieved for analysis or mapping of the environment surrounding the range finding system 100.

In a further embodiment the processor may perform a method of generating a representation of the surrounding environment in three dimensions based on the plurality of range determinations and the corresponding directions of the range determinations. In one form the representation is stored in the data store 213. In yet another embodiment, the representation of the surrounding environment is visually represented to a user on a visual display 216. This may include a three-dimensional point cloud.

Figure 9:
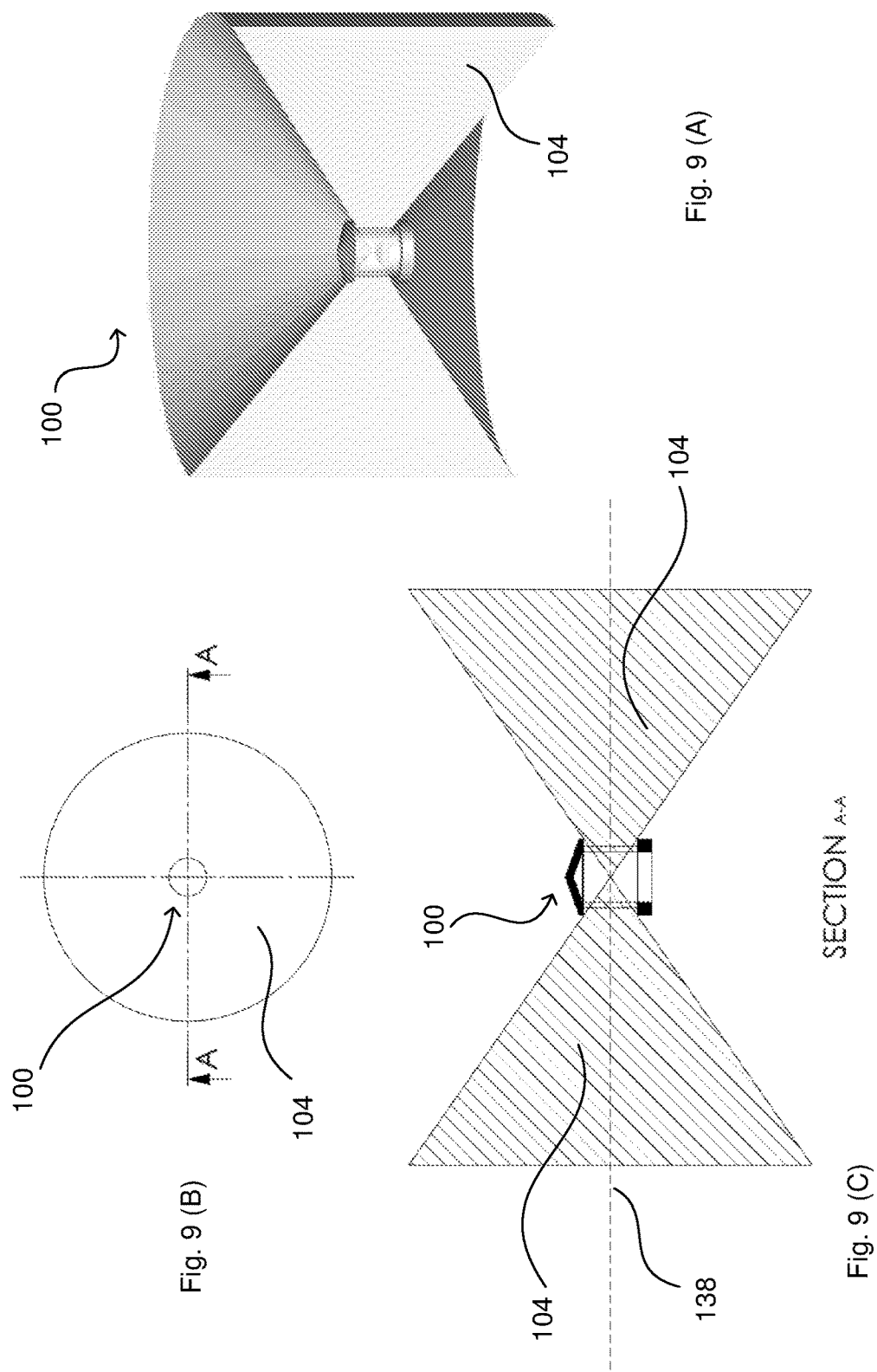
FIGS. 9(a) to 9(c) illustrate the range of possible elevations of the first beam in one form of range finding system.

Operation of the Range Finding System to Avoid Specular Reflection Interfering with the Second Input The operation of an embodiment of the range finding system 100 will now be described. The range finding system 100 is operable to provide scanning of the objects around the range finding system 100 in a full 360 degree arc around the central axis 136. This is achieved by rotating the first support element 132 around the first rotation axis 134 to a selected azimuth ϕ. The range finding system 100 is also operable to make range determinations in various elevations θ by rotating the second support element 140 around the second rotation axis 142. This is illustrated in an embodiment shown in FIGS. 9(*a*) to (*c*) that illustrates the range of elevations for the first beam 104, including elevations approximately +/−40 degrees from the horizontal plane 138. However it is to be appreciated that other embodiments may include steering in elevation more, or less, than 40 degrees from the horizontal.

Therefore during use, the range finding system 100 directs the beam in multiple directions, which must be transmitted through the enclosure 120 at multiple respective locations. Advantageously, the range finding system 100 directs the first beam 104 to the side wall 122 in a way that avoids specular reflection 128 of the first beam 104 from dazzling the electromagnetic input 108.

Figure 4:
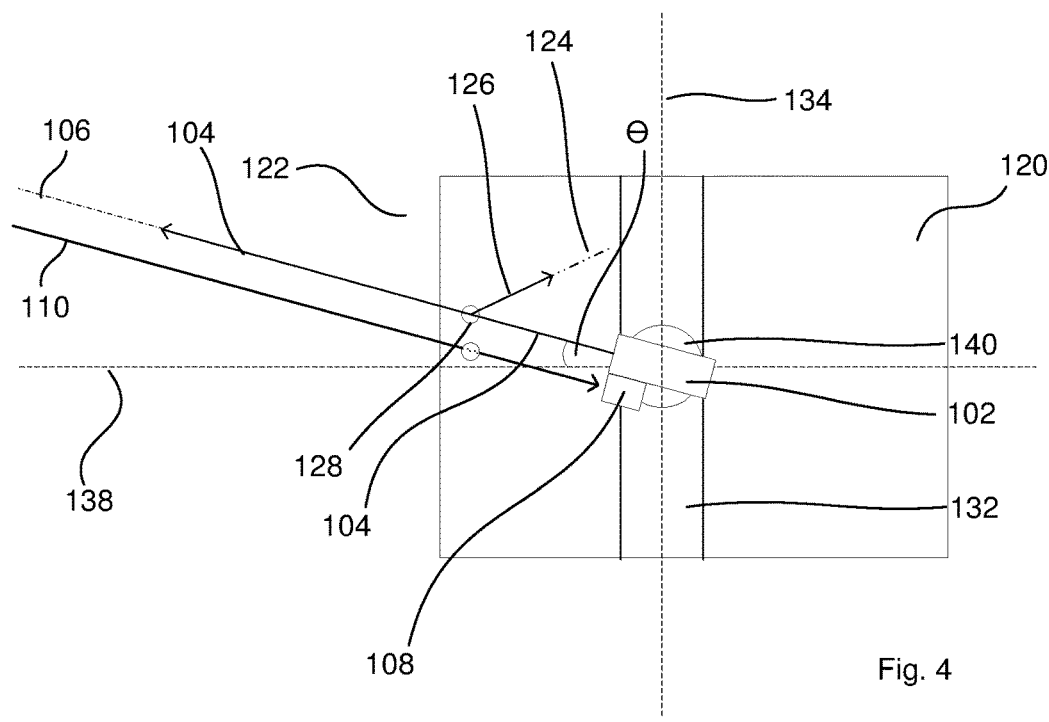
FIG. 4 is a side view of the range finding system of FIG. 2 showing the first beam provided by the electromagnetic output and reflected electromagnetic radiation of the first beam that is received by the electromagnetic input.
Figure 5:
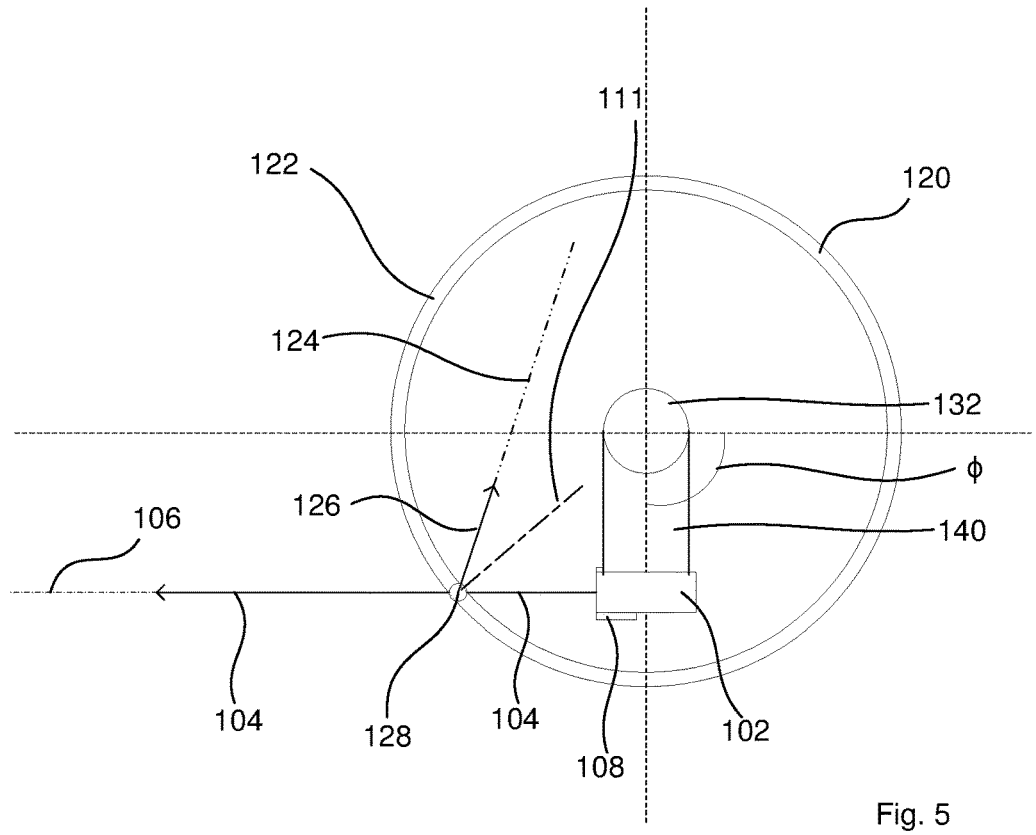
FIG. 5 is a top view of the range finding system of FIG. 4.

Referring to FIGS. 4 and 5, this is achieved by directing the first beam 104 from the electromagnetic output 102 to be incident on the side wall 122 at an angle that is substantially away from the surface normal 111. As a result, the specular reflection 128 of the first beam 104, shown as second beam 126 along the second beam path 124, is directed away from the electromagnetic input 108 (and the proximally located electromagnetic output 102).

In the embodiment shown in FIGS. 4 and 5, the incident angle of the first beam 104 to the side wall 122 is always away from the surface normal 111, regardless of the azimuth direction (from rotation of the first support element 132 around the first rotation axis 134), or the elevation angle (from rotation of the second support element 140 around the second rotation axis 142). This is achieved by providing the electromagnetic output 102 (and the corresponding first beam path 106) that is offset from the common first rotation axis 134 and central axis 136 of a substantially cylindrical side wall 122.

With respect to the above embodiment, it is to be appreciated that a first beam 104 that is incident at a side wall 122 at an angle close to but not exactly at the surface normal 111 can still provide specular reflection that can affect the electromagnetic input 108. For example, a first beam 104 with an angle of incidence of 1 or 2 degrees to the side wall 111 may reflect a substantial amount of electromagnetic radiation back towards the electromagnetic output 102 and the proximally located electromagnetic input 108. Therefore, in some embodiments, it is desirable to have an angle of incidence of the first beam 104 to the side wall 122 that is greater than 5 degrees. In another embodiment, the angle of incidence is at least 10 degrees. In yet another embodiment, the angle of incidence is at least 12 degrees, or at least 15 degrees, or at least 20 degrees. A larger angle of incidence may be advantageous to reduce the electromagnetic radiation of the second beam 126 from affecting the electromagnetic input 108 by causing the second beam 126 to be reflected away from the electromagnetic output 102 and the collocated electromagnetic input 108.

In one embodiment, the first support element 132, along with the other supported components of the range finding system 100 are rotated at approximately 0.25 revolutions a second. The second support element 140, along with the supported electromagnetic output 102 and electromagnetic input 108, may be rotated at approximately 40 revolutions a second. Continuous rotation of the support element s 132, 140 allows the range finding system 100 to make a plurality of range determinations. It is to be appreciated that other rotation speeds may be used.

Figure 13:
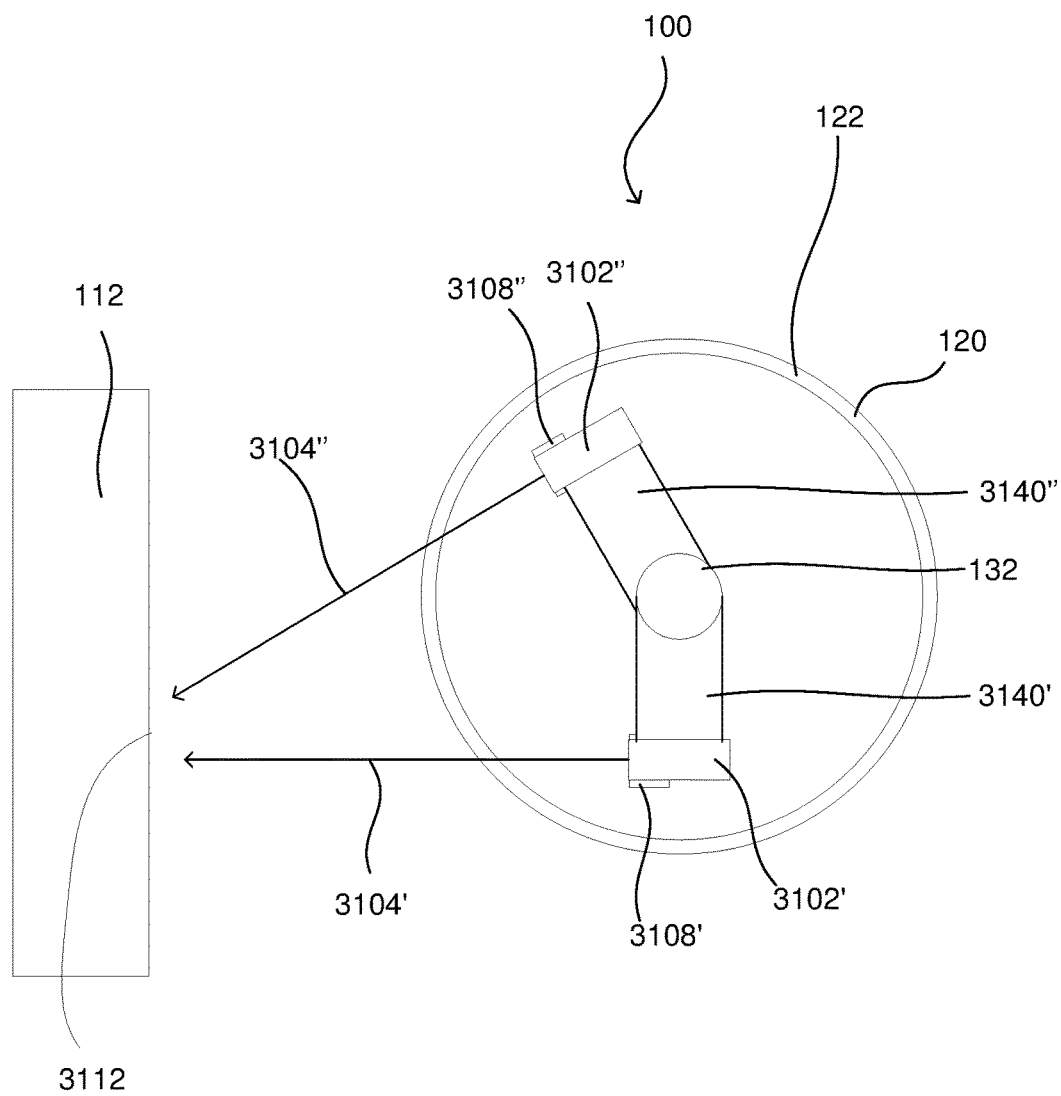
FIG. 13 is a top view of the range finding apparatus showing the electromagnetic output and input in two configurations for determining range from the same location on the object.

In one embodiment the first support element 132 and second support element 140 are rotatable to 360 degrees or more around the respective axes. This allows range determination of a point on an object 112 from two or more configurations of the electromagnetic output 112. This allows redundant measurements, or stereo measurement of range of the surface of the object, or the environment. This is illustrated in FIG. 13 where a first configuration of the electromagnetic output 3102' provides a corresponding first beam 3104' towards a point 3112 on the object 112. The reflected electromagnetic radiation (not shown for clarity) is then received by the electromagnetic input 3108'. The electromagnetic output and input can then be moved into a second configuration by movement of the support elements. In the second configuration, the electromagnetic output 3102" provides a corresponding first beam 3104" towards the same point 3112 on the object. The reflected radiation is then received by the electromagnetic input 3102".

The above described example is one solution, and it is to be appreciated that in other embodiments, a different configuration may be used to provide a first beam 104 that is not incident on the side wall 122 at an angle that causes a specular reflection 128, being the second beam 126 that is directed towards the electromagnetic input 108. For example, in one alternative the electromagnetic output 102 is a first reflector (e.g. a mirror or prism) that redirects the laser light from a laser emitter to provide the first beam 104 on the first beam path 106. In a further embodiment, the electromagnetic input 108 includes a second reflector that redirects the reflected laser light 110 to one or more light sensors. In this embodiment, the one or more first and second reflectors function to provide an offset for the laser emitter and/or light sensor to prevent the second beam 124 from dazzling the light sensor. Examples of these alternatives are described below.

Refraction of the First Beam Passing Through the Side Wall

Figure 6:
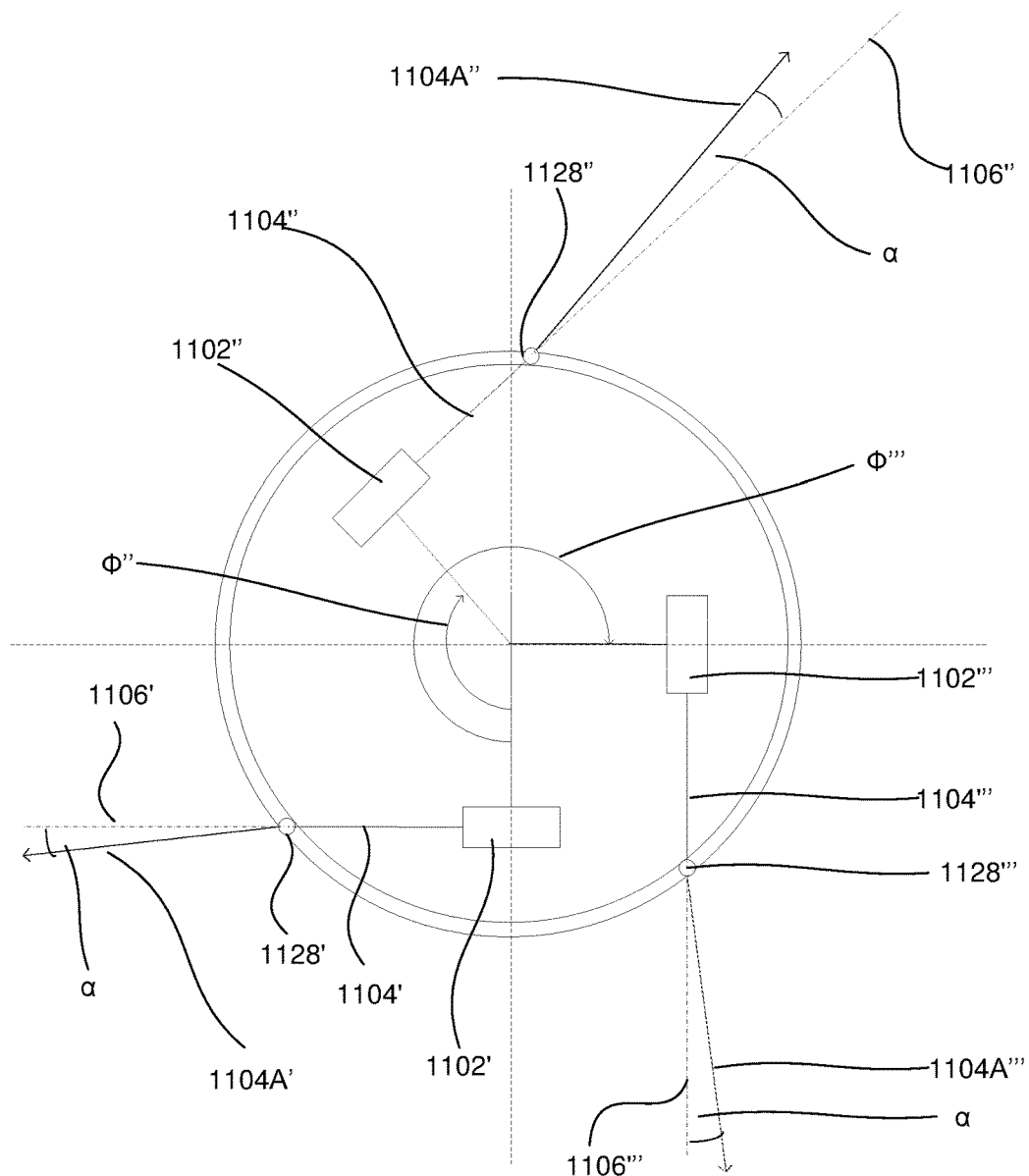
FIG. 6 is a simplified top view of the range finding system of FIG. 4 showing the electromagnetic output in three different azimuth orientations around a first rotation axis, and showing an example of refraction of the first beam.

As noted above, a substantially cylindrical side wall 122 assists the calculation and/or calibration of the range finding system 100. FIG. 6 shows a top view of the electromagnetic output in three positions, 1102', 1102", 1102''' around the first rotation axis 134 at various azimuth angles ϕ' (which is zero and not shown) ϕ" and ϕ'''. As the first beam 1104', 1104", 1104''' passes through the cylindrical side wall 122 the different refractive index of the air (within the enclosure 120 and outside the enclosure 120) compared to the refractive index of the material of the cylindrical side wall 122 causes refraction of the first beam 1104', 1104" and 1104'''. This alters the path of the first beam, which may include a change in direction and/or causing the path of the first beam to be displaced. In FIG. 6 this is illustrated by the first beam 1104', 1104" and 1104''' that is incident on the cylindrical side wall 122. The path of the transmitted first beam 1104A', 1104A" and 1104A''' is altered as illustrated in FIG. 6 by angle α from the respective original beam path 1106', 1106" and 1106'''. Since the first rotation axis 134 and the central axis 136 are coaxial and that the cylindrical side wall 122 is substantially cylindrical, the alteration of the path of the first beam 1104, at least in the components of the path in the directions perpendicular to the central axis 134, are substantially constant. That is, the alteration to the transmitted path of the first beam 1104A', 1104A", and 1104A''' is substantially the same (as illustrated by angle α) for all azimuth directions ϕ around the central axis 136 as shown in FIG. 6.

It is to be appreciated that the alteration to the path shown by angle α is not exclusive and that, depending on the properties of the material and physical configuration, the alteration to the first beam path could include a displacement in the beam. In yet another alternative, the transmitted first beam 1104A', 1104A" and 1104A''' may have a path that is displaced and directed towards a different direction compared to the incident beam 104', 104" and 104'''. It will be appreciated that the path of the reflected radiation 110 that passes through the side wall 122 and is received by the electromagnetic input 108 can be calculated (and/or calibrated) with similar principles to that described for the first beam 1104.

For clarity in this description, only the alteration of the beam path for components in the directions perpendicular to central axis 136 are described in FIG. 6. The alteration of the path of the first beam 104 due to the relative elevation θ of the electromagnetic output 102 will now be described with reference to FIG. 7(*a*) to FIG. 7(*c*).

Figure 7A:
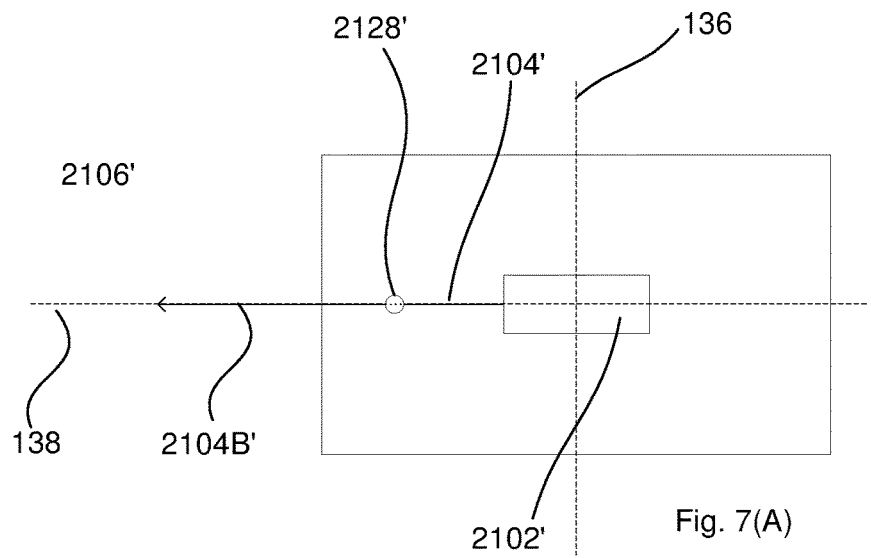
FIGS. 7(a) to 7(c) is a simplified side view of FIG. 4 showing the electromagnetic output in three different elevation orientations around a second rotation axis, and showing an example of effects of refraction of the first beam.
Figure 7B:
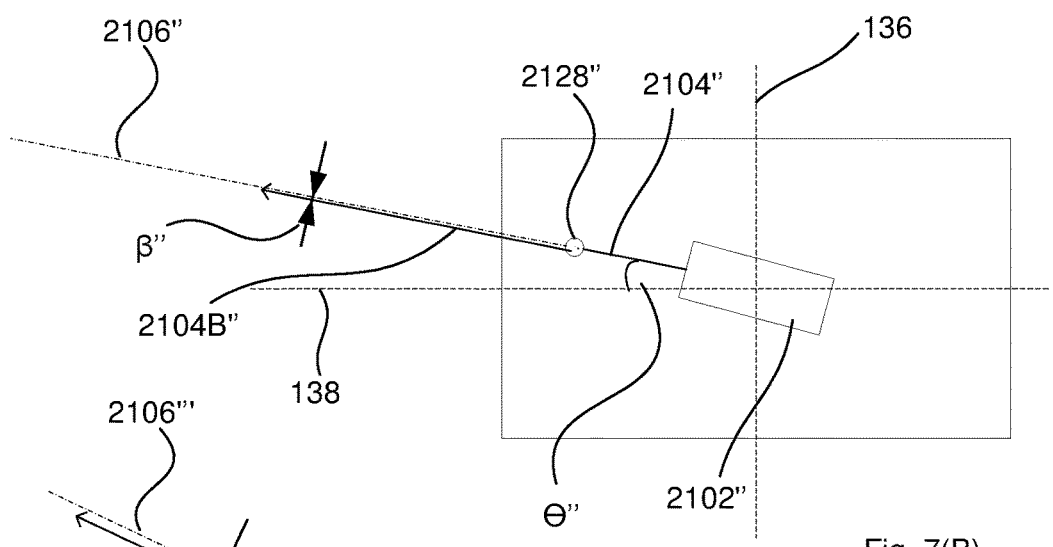
Figure 7C:
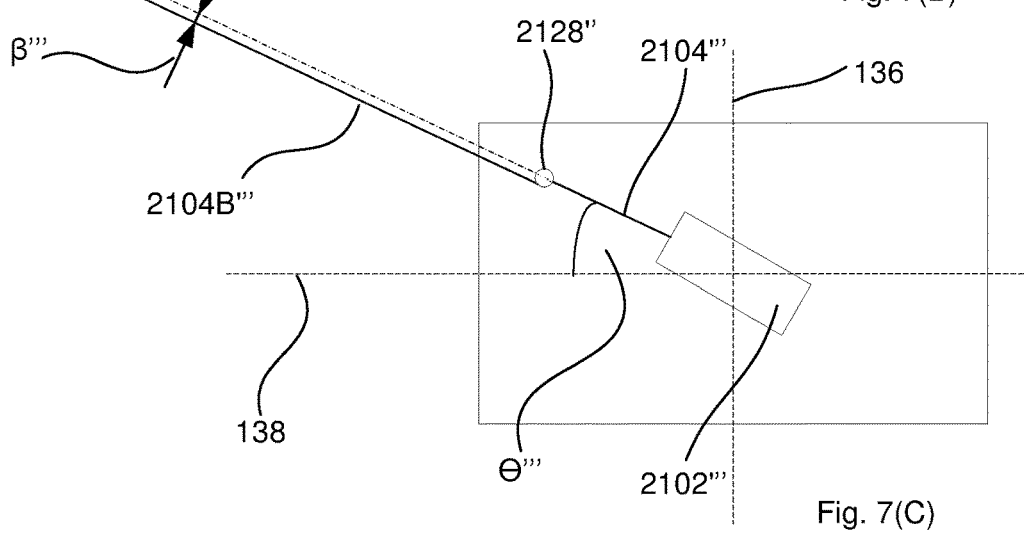

FIG. 7(*a*) illustrates an electromagnetic output 2102 orientated at an elevation of 0 degrees such that the first beam 2104' is substantially parallel to the plane 138 perpendicular to the central axis 136. In this orientation, the transmitted first beam 2104B' is, with respect to the elevation component, substantially parallel and coaxial to the first beam 2104' since refraction in the elevation component is substantially zero.

FIG. 7(*b*) illustrates the electromagnetic output 2102" orientated at an intermediate elevation of θ" above the plane 138 perpendicular to the central axis 136. In this configuration the transmitted first beam 2104B" has an altered path relative to the first beam 2104" as the elevation of the electromagnetic output causes the first beam 2104" to be incident on the cylindrical side wall 122 at an incidence angle greater than zero degrees, resulting in refraction of the first beam in the elevation component. The deviation of the transmitted first beam 2104B" and the first beam 2104" is shown as displacement β". However, it is to be appreciated that the deviation is not limited to displacement but may, alternatively or in conjunction, be a change of direction of the beam path as discussed above.

FIG. 7(*c*) illustrates the electromagnetic output 2102''' orientated at a high elevation of θ''' above the plane 138 perpendicular to the central axis 136. In this configuration the transmitted first beam 2104B''' has a greater altered path relative to the first beam 2104''' as the higher elevation of the electromagnetic output causes a greater angle of incidence resulting in greater refraction and consequent displacement of the first beam in the elevation component. The deviation of the transmitted first beam 2104B''' and the first beam 2104''' is shown as displacement β'''. In this embodiment, β''' is greater than β" and the displacement β increases as the elevation angle θ increases.

In one form, the calculation of the alteration of the path of the first beam, including α and β, may be calculated with Snell's law (Equation 2) together with the relevant refractive indexes.

$$\frac{\sin \theta_1}{\sin \theta_2} = \frac{v_1}{v_2} = \frac{n_2}{n_1} \qquad \text{(Equation 2)}$$

where

θ is the angle of the path of light measured from the surface normal of the boundary between medium 1 and 2, v is the velocity of light in the respective medium, and n is the refractive index of the respective medium.

In one form, the configuration of the electromagnetic output 102 is provided to avoid total internal reflection of the first beam 104 when the first beam is incident on the cylindrical side wall 122. This configuration may include providing the first and second support elements 132, 130 such that the electromagnetic output 102 would not be orientated to provide a first beam 104 that has an incidence angle above a critical angle of the air to side wall, or side wall to air, boundary.

Variations and Alternatives

Further variations and alternatives of the range finding system 100 will now be described.

Shielding the Electromagnetic Input

Figure 11A:
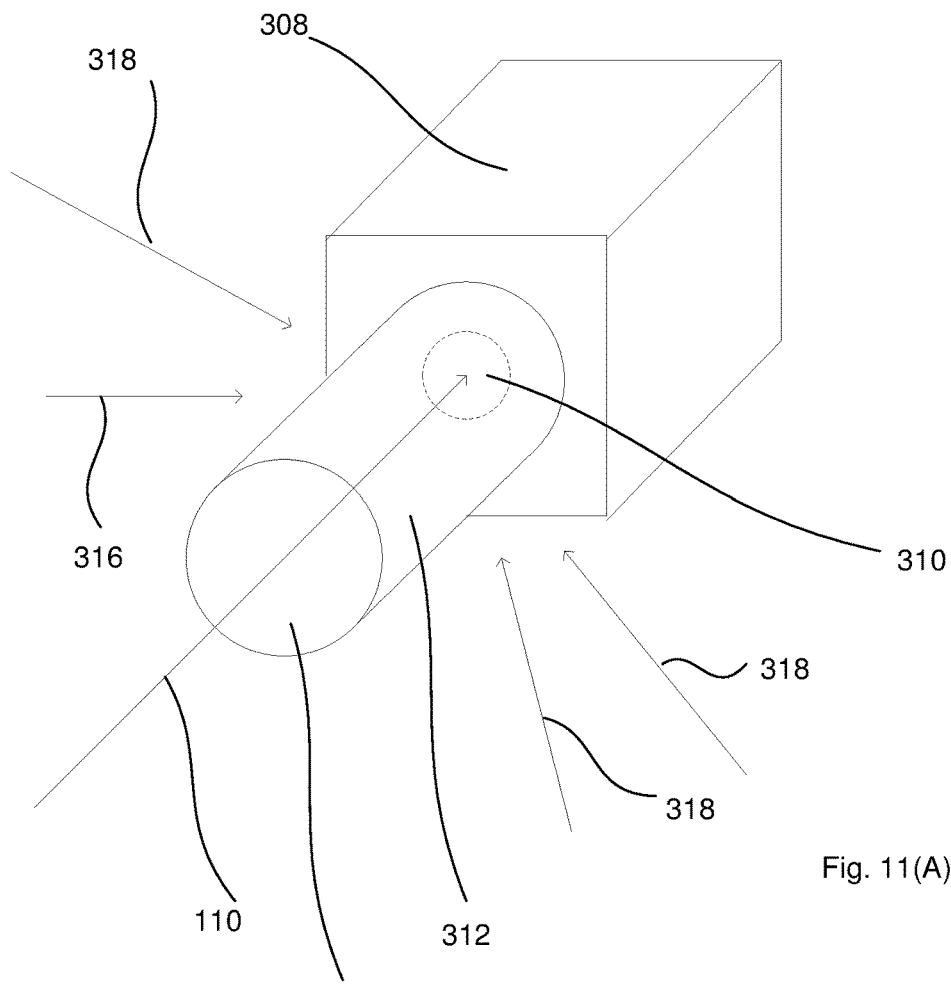
FIGS. 11(a) and 11(b) are perspective views of an electromagnetic input having a hood to shield the magnetic input from unwanted electromagnetic radiation.
Figure 11B:
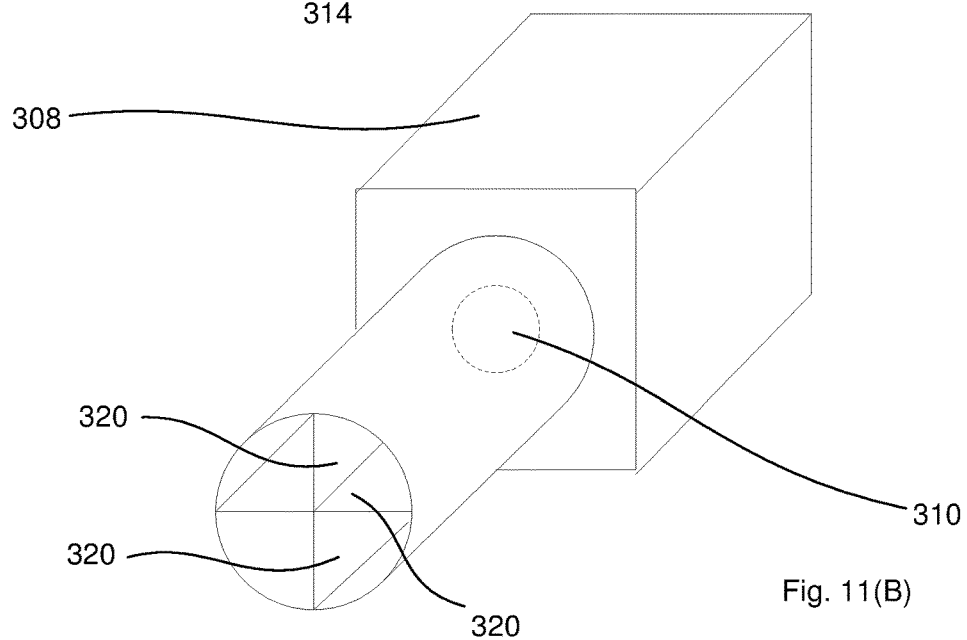

FIGS. 11(*a*) and (*b*) illustrate an embodiment of the electromagnetic input 108, having a light sensor 310 that is shielded by a hood 312. The hood 312, in one embodiment, is in the form of a hollow tube forming a passage 314. In use, the hood 312 is movable with the other parts of the electromagnetic input 108 so that the passage is generally directed towards the object 112 that the range finding system 100 is ranging. The passage allows the reflected electromagnetic radiation 110 from the object 112 to pass through the hood 312 to be detected by the light sensor 310. Conversely, the hood blocks electromagnetic radiation from alternative directions, such as second beam 316 or third and subsequent beams 318 to be directly received by the light sensor 310. This may be advantageous to prevent the second beam 316 reflecting multiple times off the side wall 122 from being directly received by the light sensor 310. In addition, the hood 312 may shield the light sensor 310 from other sources of electromagnetic radiation that may affect the sensor 310, such as lights (for illumination), light from the sun, electromagnetic radiation from multi-path of the reflected electromagnetic radiation, or electromagnetic radiation other range finding equipment operating in the area.

In one embodiment, the hood 312 may include anti-reflective surfaces. Anti-glare baffles 320 may be included to shield the light sensor 310 as shown in FIG. 11(*b*).

Dust Contamination Test

In use, dust or other contaminants may adhere to the enclosure 120 that may reduce the performance and effectiveness of the range finding device 100. For example, dust on the exterior of the enclosure 120 or inside the enclosure may attenuate, or otherwise disrupt the first beam 104 and/or the reflected electromagnetic radiation 110. This may reduce the effective range of the range finding device or at worst, prevent range determination altogether.

In some embodiments the dust is a combustible dust, such as coal dust or soot. In such circumstances, an increase in dust levels either inside or outside the enclosure may reflect an elevated safety risk. Periodic maintenance inspection of the enclosure may be used to ensure dust levels do not reach elevated levels which may detrimentally impact apparatus performance or heighten safety risks.

In one embodiment, the range finding device 100 includes means to determine the level of contamination and performance of the range finding device 100. Preferably, the range finder triggers an alert or shuts down the device if the contamination levels exceed a predetermined amount. In one embodiment, this predetermined amount corresponds to contamination levels having elevated level of ignition risk. Referring to FIG. 12(*a*), the range finding device 100 includes a reflector 351 with a reflective surface 353 provided outside of the enclosure 120. The reflector 351 provides a reflective surface 353, with a known reflectivity, to provide a test (or calibration) surface.

In one form, a contamination test includes the range finding system 100 providing a first beam 104 that passes through the side wall 122, and is reflected off the reflective surface 353, and the reflected electromagnetic radiation 110 passing through the side wall 122 to be received by the electromagnetic input 108. The intensity of the received electromagnetic radiation 110 can be compared to past intensities of reflected electromagnetic radiation 110 reflected from the reflective surface 353. A reduction in the intensity can be indicative of degraded performance, such as dust contaminating the outside of the side wall 122, inside of the side wall, or other components such as on the electromagnetic output 102 and the electromagnetic input 108. The reduction in intensity may also be indicative of a contaminated reflective surface 353.

Figure 12A:
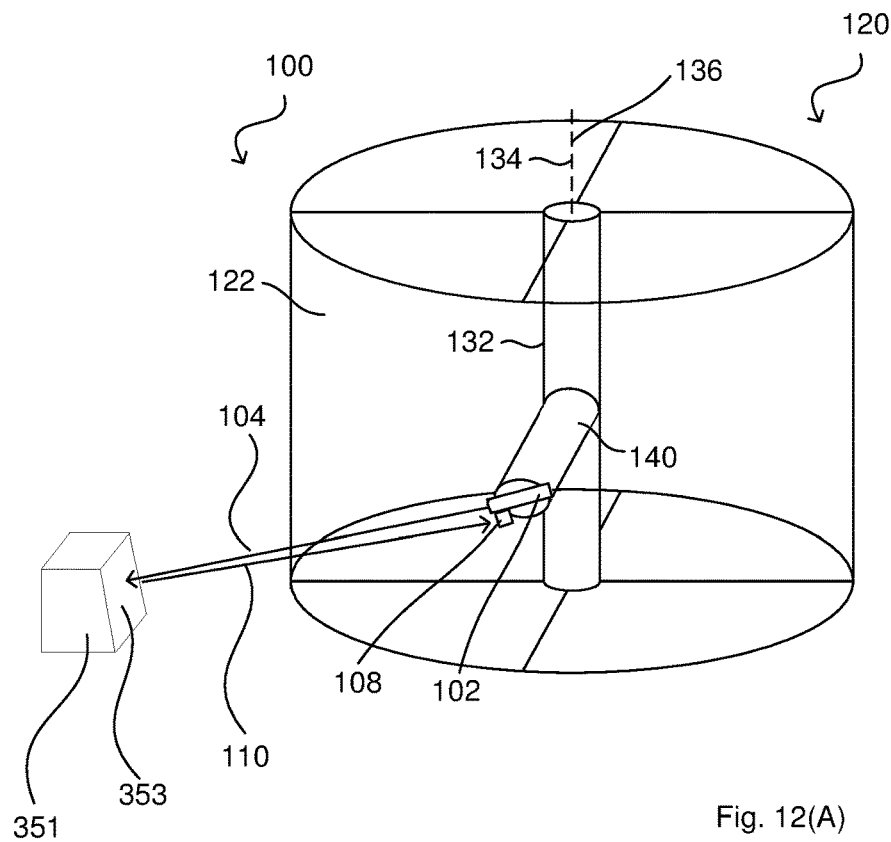
FIGS. 12(a) and 12(b) are perspective views of a range finding system including reflectors for testing operation of the range finding apparatus.
Figure 12B:
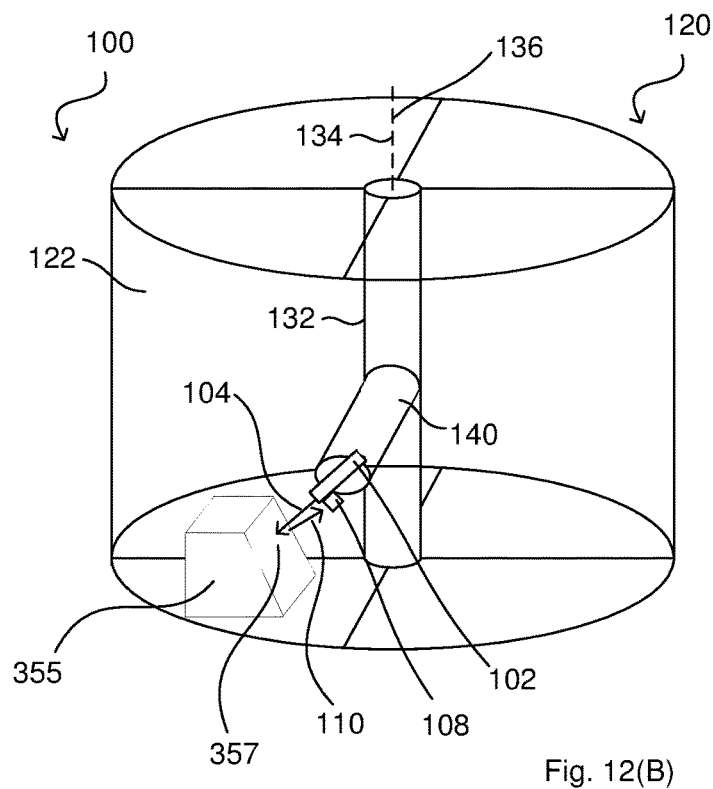

FIG. 12(b) illustrates a further embodiment having a reflector 355 with a reflective surface 357 inside of the enclosure 120. This allows a contamination test directed towards determining contamination inside of the enclosure 120, such as on the electromagnetic output 102 and input 108. Alternatively, it may be used to determine the condition of the electromagnetic output 102 and input 108. For example, over time and use there may be a deterioration with intensity of output 102, or sensitivity of the input 108 to electromagnetic radiation.

In a further form, the result of the contamination test from the outside of the enclosure 120 as shown in FIG. 12(a) is compared with the result from the contamination test of the inside of the enclosure 120 as shown in FIG. 12(b). The comparison can provide an indication of the contamination of the side wall 122 of the enclosure 120 compensating, or ruling out, the contamination or reduction in performance of the electromagnetic output 102 and input 108.

In another example, the range finding system 100 monitors the signal to noise ratio of the electromagnetic input 108. A decreasing signal to noise ratio may be indicative of dust contamination of one or more components of the range finding system 100. This may be used as an alternative, or in conjunction with the above described contamination test.

In one form, a program in the program memory 211 causes the processor 209 to direct the controller module 201 to perform a contamination test described above. This may be performed at regular time intervals during operation, on start-up, on shut-down, or if the received radiation at the electromagnetic input 108 has been determined to be lower than expected for the given range of the object 112 and/or material of the object 112. Furthermore the program, in response to a determination that the range finding system 100 is contaminated, may prompt an operator to service the range finding system 100 and/or shutdown the range finding system 100. This may be important in circumstances where the contaminate is a fire risk.

In one form, the controller 201 determines the time difference between the electromagnetic output 102 sending a pulse of electromagnetic radiation and the electromagnetic input 108 receiving the reflected pulse of electromagnetic radiation without determining the intensity of the received electromagnetic radiation. In other words, the electromagnetic input 108 acts as a trigger to stop the counting of clock pulses. This avoids the requirement for an ultra-fast analog-digital (A/D) conversion and therefore, reduces the cost, complexity and power consumption of the controller.

In order to determine contamination of the range finder or the presence of particles in the environment or on the side wall 122, the controller 201 may switch the electromagnetic output 102 from pulse mode to continuous mode and switches the controller port connected to the electromagnetic input 108 from trigger mode to A/D mode. Since the electromagnetic output 102 is continuous, a slow A/D conversion as provided by common microcontrollers can be used.

The result, that is the digital value representing the intensity of the received electromagnetic radiation, can then be compared by processor 209 to a threshold stored on data memory 213. If the result is below the threshold, the processor 209 determines that the contamination is above an acceptable level. The processor 209 may then activate an alarm or activate a control light to indicate excess contamination to an operator. This procedure of determining contamination may be performed periodically. Preferably, this procedure is performed every 10 seconds or after ten revolutions around the central axis 136.

In one form, stored on data memory 213 are values of azimuth and elevation of the electromagnetic output that are indicative of the direction from the electromagnetic output 102 to a reference mirror (such as reflective surface 353, 357). Processor 209 may then send control data to the controller module 201 to cause the electromagnetic output 102 to be switched to continuous output when the azimuth and elevation of the output 102 are equal to the stored values or within a range, such as 1 degree, of the stored values.

Processor 209 also sends control data to the controller module 201 to cause the controller port connected to the electromagnetic input 108 to be switched to A/D conversion when the azimuth and elevation of the output 102 are equal to the stored values or within a range, such as 1 degree, of the stored values.

This way, the distance to the reference mirror 353, 357 is not determined but instead, the contamination can be measured at each evolution of the output 102 around axis 134 without starting and stopping the movement of the output 102, which reduces mechanical stress on the components.

Variations to the Configuration of the Electromagnetic Output and Input

Figure 14A:
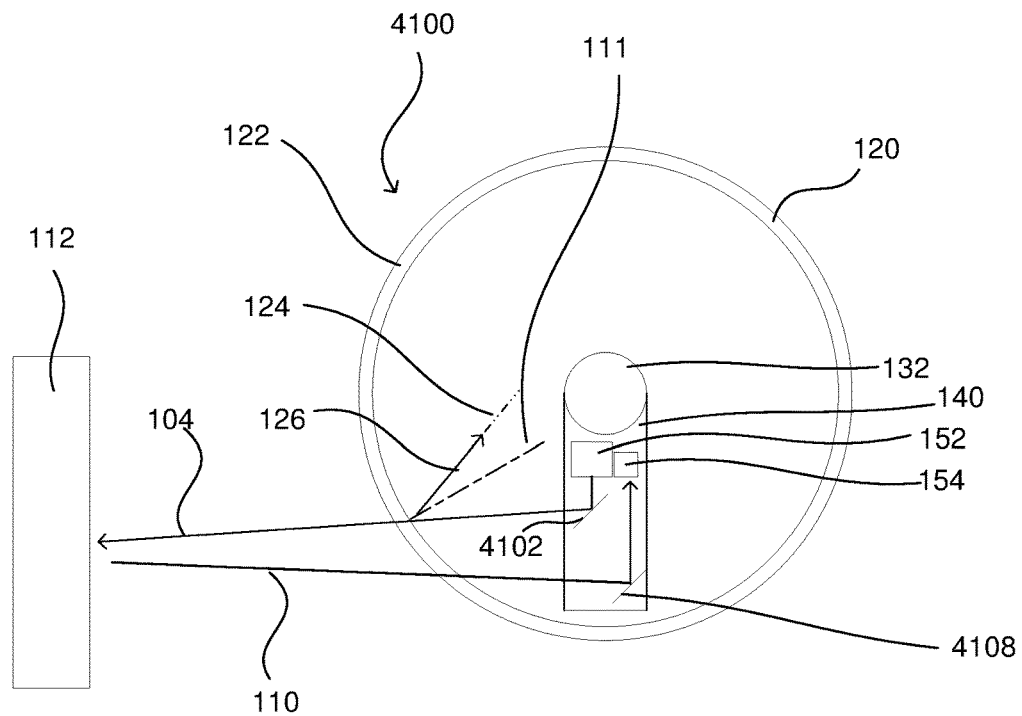
FIGS. 14(a) and 14(b) are top views of alternative forms of the range finding apparatus.

A variation of the range finding system 4100 will now be described with reference to FIG. 14(a). In this variation the electromagnetic output 4102 includes a reflector, for example, a mirror. The electromagnetic output 4102 redirects a beam of electromagnetic radiation from the emitter 152 to provide the first beam of electromagnetic radiation 104. The electromagnetic input 4108 also includes a reflector, which may also be a mirror. The electromagnetic input 4108 redirects reflected electromagnetic radiation 110 towards an electromagnetic radiation sensor 154. In this embodiment the use of one or more reflectors, in conjunction with the geometry of the side walls 122, provide a second beam path 124 of the second beam 126 that avoids dazzling the sensor 154.

In another variation, the reflectors of the electromagnetic input 4108 and the electromagnetic output 4102 are formed by a common reflector.

Figure 14B:
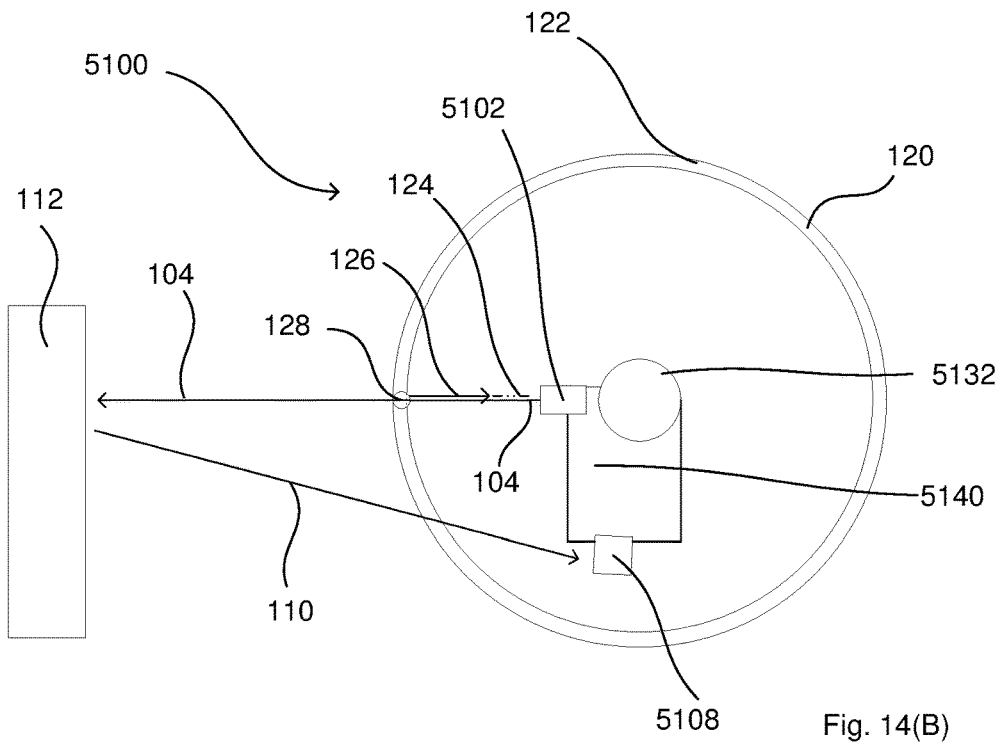

Another variation of the range finding system 5100 will now be described with reference to FIG. 14(b). In this variation, the electromagnetic output 5102 and the electromagnetic input 5108 are rotatably supported and steered by the second support element 5140 and the first support element 5140. In this variation, the electromagnetic output 5102 provides a first beam 104 that is incident on the side wall 122 at or substantially close to the surface normal. A resultant specular reflection 128 provides a second beam 126 on a second beam path 124 that is direct back towards the electromagnetic output 5102. Nonetheless, in this configuration, the electromagnetic input 5108 is located outside the second beam path 124 to avoid or reducing the effects of specular reflection to the electromagnetic input 5108.

Variation to the Side Wall of the Enclosure

Variations of the range finding system 6100, 7100, 8100 having different configurations of the side wall, including an outer side wall and an inner side wall, will now be described with reference to FIGS. 15(a) to 15(c).

Referring to FIG. 15(a) the range finding system 6100 has an enclosure 120 with an inner side wall 6122a that surrounds the electromagnetic output 102 and input 108. An outer side wall 6122b, in turn, surrounds the inner side wall 6122a. In this embodiment, a void 6131 is defined between the outer side wall 6122b and inner side wall 6122a.

The outer side wall 6122b and the inner side wall 6122a may be made of different materials. An advantage of using different materials is that different respective properties of the materials can be combined. For example, the outer side wall 6122b may be made of a material with high impact resistant material to provide an impact resistant barrier. The inner side wall 6122a may be made of a material that withstands high pressures (such as at least 100 kPa, or at least 500 kPa, or at least 1000 kPa). In one embodiment the outer side wall 6122b is constructed of glass to provide scratch resistance. The inner side wall 6122a may be constructed of transparent plastic, such as polycarbonate, to provide a pressure resistant barrier. Therefore the combination of the outer side wall 6122b and inner side wall 6122a may be configured to meet one or more user requirements, which may include conformity to industry standards as discussed herein.

In another variation, the outer side wall 6122b and inner side wall 6122a are made of the same material with the same or different wall thicknesses. In one embodiment, the outer 6122b and inner 6122a side walls are constructed of glass. Having two side walls may be advantageous in that the outer side wall 6122b can be a sacrificial barrier that can be replaced as required without exposing the electromagnetic output 102 and input 108 to contaminants. This may be particularly advantageous if replacement is done in the field, such as dusty environments often encountered in mines.

The void 6131 between the outer side wall 6122b and inner side wall 6122a may advantageously provide a stand-off to reduce the effect of an impact on the outer side wall 6122b from affecting the inner side wall 6122a and the components of the system contained therein. For example, the outer side wall 6122b may absorb an impact that causes it to deform. However, the void 6131 provides a spacing away from the inner side wall 6122a so that the force of the impact is not directly transmitted to the surface of the inner side wall 6122a.

Another embodiment of the range finding system 7100 is illustrated by FIG. 15(*b*) which includes an inner side wall 7122a made of a rigid material surrounded by an outer side wall in the form of a protective film 7122b. The protective film 7122b may be a peelable transparent plastic film that can be removed and replaced when the film is scratched, otherwise damaged or contaminated. Advantageously, the protective film 7122b may provide a low cost and easily replaceable sacrificial barrier to allow ease of maintaining transparency of the enclosure 120. The protective film 7122b may include polyester films similar to those used on racing car windshields, such as those by MADICO, Inc., Woburn, Mass. with product designations LCL-600-XSR and LCL-800-XSR as well as 5-7 mil films sold by that company.

Yet another embodiment of the range finding system 8100 is illustrated by FIG. 15(*c*) which includes an inner side wall 8122a that is laminated or adhered to an outer side wall 8122b using an adhesive layer 8123. The adhesive layer may include a liquid resin is a made from a plastic polymer formulated from an acrylic or silicone base compound. This may be the type that includes photo initiators which will tend to cure the applied resin very quickly when it is exposed to UV light. One such adhesive could be UV CURE 7155 from Epoxies Etc., Deco-Coat Product Line, 21 Starline Way, Cranston, R.I. 02921. In one example, the adhesive agent includes polyvinyl butyral (PVB). The adhesive layer preferably reduces the propensity and/or magnitude of the enclosure to provide multiple reflections of the electromagnetic radiation source as well as providing an impact barrier between the inner and outer wall.

In an exemplary embodiment, the enclosure 120 comprises a dual walled glass cylinder consisting of an inner 8122a and an outer 8122b side walls formed of glass cylinders laminated together using PVB (polyvinyl butyral) 8123 or other suitable laminating/adhesive substance.

The outer 6122b and inner 6122a side walls may cause multiple respective points of reflection and refraction of light, such as at location 6128a, 7128a, 8128a at the inner side wall 6122a, 7122a, 8122a and location 6128b, 7128b, 8128b at the outer side wall 6122b, 7122b, 8122b. Adjustments for these effects may be made by calibration and/or calculation as those described earlier but with consideration of the multiple reflections and refractions. Furthermore, the reflection and refraction caused by the adhesive layer 8123 should also be considered.

Other Features

In one form the electrical and electronic components (including lasers, motors and controller) inside the enclosure 120 of the range finding device 100 do not consume more than 6 W of power to reduce the risk of ignition by the range finding system heating up. It is to be appreciated that the maximum levels of power consumption may vary depending on the relevant standards for the country or jurisdiction.

The range finding system preferably conforms one or more (more preferably two or more) of International standard IEC 60079-0; IEC 60079-1; US standards: ANSI/UL1203:2006, British standards BS EN 60079-1:2007; and Australian standards AS60079.1:2007. In a preferred embodiment, the range finding system also conforms group 1 gas standards (e.g. coal mining environments).

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

Applications

The range finding system of the present invention is particularly suitable for use in environment which are susceptible to fire or explosion, particular upon exposure to an ignition source. In one embodiment, the range finding system is used for determining the range of an object within a mine, in particularly a coal mine. The atmospheric environment within coal mines may contain an explosive and/or flammable mixture of coal dust, methane and oxygen.

The invention claimed is:

1. A range finding system comprising:
    an electromagnetic output to provide a first beam of electromagnetic radiation along a first beam path;
    an electromagnetic input to receive reflected electromagnetic radiation of the first beam from an object for determining a range of the range finding system from the object;
    an enclosure including a side wall that surrounds a central axis of the enclosure, the side wall transparent to the electromagnetic radiation provided by the electromagnetic output; and
    a first support element rotatable within the enclosure around a first rotation axis, wherein the first rotation axis is coaxial with the central axis,
    wherein the electromagnetic output and electromagnetic input are disposed within the enclosure and supported by the first support element such that a rotation of the first support element: steers the first beam provided by the electromagnetic output; and steers the electromagnetic input to receive the reflected electromagnetic radiation of the first beam from the object, wherein the electromagnetic output is offset from the central axis such that the first beam path from the electromagnetic output to the side wall does not intersect the central axis and that the electromagnetic input is located outside a second beam path of a second beam of electromagnetic radiation defined by a specular reflection of the first beam on the side wall; and wherein an angle of incidence between the first beam path and a surface normal of the side wall is greater than 5 degrees.

2. The range finding system of claim 1 wherein the enclosure further comprises one or more features which prevent the ignition of gas outside the enclosure by ignition triggers from the inside of the enclosure.

3. The range finding system of claim 2, wherein the one or more features comprise sealing elements that in conjunction with the side wall seal an inside of the enclosure from outside of the enclosure such that the one or more sealing elements prevent ignition of gas outside the enclosure by ignition triggers from the inside of the enclosure.

4. The range finding system of claim 1 further comprising:
a second support element to provide support between the electromagnetic output and the first support element, wherein the second support element is rotatable around a second rotation axis, and wherein rotation of the second support element steers the first beam provided by the electromagnetic output.

5. The range finding system of claim 4, wherein the second rotation axis is perpendicular to the first rotation axis.

6. The range finding system of claim 1 further comprising:
a controller module to steer the first beam to a plurality of orientations to provide a plurality of range determinations of the object(s) in a surrounding environment.

7. The range finding system according to claim 6, further comprising:
a processor to generate a representation of the surrounding environment in three dimensions based on the plurality of range determinations.

8. The range finding system of claim 1 wherein the electromagnetic output includes a laser emitter to provide the first beam in the form of laser light and wherein the electromagnetic input includes a light sensor to receive reflected laser light from the object.

9. The range finding system of claim 1 further comprising:
a laser emitter to provide the first beam in the form of laser light,
wherein the electromagnetic output includes a first reflector to redirect the first beam onto the first beam path.

10. The range finding system of claim 9 further comprising:
a light sensor to detect reflected laser light from the object,
wherein the electromagnetic input includes a second reflector to redirect reflected laser light towards the light sensor.

11. The range finding system of claim 1 wherein an angle of incidence between the first beam path and a surface normal of the side wall is less than a critical angle with of the side wall.

12. The range finding system of claim 1 wherein the side wall is a cylindrical side wall.

13. A range finding apparatus for use within a flameproof enclosure including a cylindrical side wall that surrounds a central axis of the enclosure, the range finding apparatus comprising:
an electromagnetic output to provide a first beam of electromagnetic radiation along a first beam path through the cylindrical side wall that is transparent to the electromagnetic radiation;
an electromagnetic input to receive reflected electromagnetic radiation of the first beam from an object for determining a range of the range finding apparatus from the object;
a first support element rotatable around a first rotation axis, wherein the first rotation axis is coaxial with the central axis,
wherein the electromagnetic output and electromagnetic input are supported by the first support element and rotation of the first support element: steers the first beam provided by the electromagnetic output; and steers the electromagnetic input to receive the reflected electromagnetic radiation of the first beam from the object,
wherein the electromagnetic output is mounted offset from the central axis such that the first beam path from the electromagnetic output to the cylindrical side wall does not intersect with the central axis, such that when the range finding apparatus is within the enclosure with the first rotation axis coaxial to a centre axis of the cylindrical side wall, the electromagnetic input is located outside a second beam path of a second beam caused by specular reflection of the first beam on the cylindrical side wall; and
wherein an angle of incidence between the first beam path and a surface normal of the side wall is greater than 5 degrees.

14. A range finding apparatus according to claim 13 further comprising:
a second support element to provide support between the electromagnetic output and the first support element, wherein the second support element is rotatable around a second rotation axis wherein rotation of the second support element steers the first beam provided by the electromagnetic output,
wherein the second rotation axis is perpendicular to the first rotation axis.

15. A range finding system according to claim 1 which conforms to one or more of International standard IEC 60079-0; IEC 60079-1; US standards: ANSI/UL1203:2006, British standards BS EN 60079-1:2007; and Australian standards AS60079.1:2007.

16. A range finding system comprising:
a laser emitter to provide a first beam of laser light along a first beam path;
a light sensor to receive reflected laser light of the first beam from an object for determining a range of the range finding system from the object;
an enclosure including a cylindrical side wall that surrounds a central axis of the enclosure, the side wall transparent to the light provided by the laser emitter, wherein the enclosure includes one or more features which prevent the ignition of gas outside the enclosure by ignition triggers from the inside of the enclosure; and
a first support element rotatable within the enclosure around the first rotation axis, wherein the first rotation axis is coaxial with the central axis, wherein the laser emitter and light sensor are supported by the first support element such that rotation of the first support element: steers the first beam provided by the laser emitter; and steers the electromagnetic input to receive the reflected laser light of the first beam from the object;

wherein the laser emitter and light sensor are disposed within the enclosure, with the laser emitter located offset from the central axis such that the first beam path from the laser emitter to the side wall does not intersect the central axis, and the light sensor is located outside a second beam path of a second beam of laser light defined by a specular reflection of the first beam on the cylindrical side wall; and wherein an angle of incidence between the first beam path and a surface normal of the side wall is greater than 5 degrees.

17. The range finding system of claim 16, further comprising a controller to steer the first beam towards a reflector;
determine an intensity value indicative of an intensity of light reflected off the reflector and received by the light sensor; and
determine a level of contamination by coal dust particles based on the intensity value.

18. A method of determining a range of an object within an enclosed environment using the range finding system of claim 1 or the range finding apparatus of claim 13.

* * * * *